US012719211B2

(12) United States Patent
Hirota

(10) Patent No.: US 12,719,211 B2
(45) Date of Patent: Aug. 25, 2026

(54) LEVER-TYPE CONNECTOR

(71) Applicant: SUMITOMO WIRING SYSTEMS, LTD., Mie (JP)

(72) Inventor: Masanori Hirota, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 364 days.

(21) Appl. No.: 18/443,820

(22) Filed: Feb. 16, 2024

(65) Prior Publication Data

US 2024/0291200 A1 Aug. 29, 2024

(30) Foreign Application Priority Data

Feb. 28, 2023 (JP) ................................ 2023-029415

(51) Int. Cl.
*H01R 13/629* (2006.01)
*H01R 13/641* (2006.01)

(52) U.S. Cl.
CPC ..... *H01R 13/62933* (2013.01); *H01R 13/641* (2013.01)

(58) Field of Classification Search
CPC ........................ H01R 13/62933; H01R 13/641
USPC .......................................................... 439/345
See application file for complete search history.

(56) References Cited

U.S. PATENT DOCUMENTS 5,823,809 A * 10/1998 Wakata .............. H01R 13/5202 439/157
5,957,710 A * 9/1999 Nagano ................ H01R 13/193 439/157
6,319,050 B1 * 11/2001 Miyazaki ......... H01R 13/62938 439/157
6,328,582 B1 * 12/2001 Fukamachi .......... H01R 13/642 439/157
9,028,267 B2 * 5/2015 Furuya ............. H01R 13/62933 439/271
9,385,473 B2 * 7/2016 Iwatani .............. H01R 13/6295
10,148,037 B2 * 12/2018 Hirota ..................... H01R 24/00
11,245,226 B2 * 2/2022 Yamane ............... H01R 24/005
2003/0017026 A1 * 1/2003 Tachi ............... H01R 13/62938 411/157
2006/0051994 A1 * 3/2006 Fujii .................... H01R 13/639 439/157

(Continued)

FOREIGN PATENT DOCUMENTS

JP 2010-160942 A 7/2010

*Primary Examiner* — Harshad C Patel
(74) *Attorney, Agent, or Firm* — Venjuris, P.C.

(57) ABSTRACT

A lever-type connector of the present disclosure is provided with a housing, a lever and a detecting member. A transportation position is set between a temporary locking position and a complete locking position in a movement path of the lever. The lever includes a lever lock portion and a transportation lock portion. The housing includes a complete locking portion for holding the lever at the complete locking position by being locked to the lever lock portion and a temporary locking portion for holding the lever at the transportation position by being locked to the transportation lock portion. The detecting member is held at the standby position by being locked by the lever lock portion at the transportation position, and allowed to move from the standby position to the detection position by releasing locking with the lever lock portion by the complete locking portion at the complete locking position.

5 Claims, 20 Drawing Sheets

(56) References Cited

U.S. PATENT DOCUMENTS

| | | | | |
|---|---|---|---|---|
| 2017/0279222 | A1* | 9/2017 | Kayano | H01R 13/62977 |
| 2018/0248310 | A1* | 8/2018 | Hirota | H01R 24/00 |
| 2020/0059040 | A1* | 2/2020 | Ohtaka | H01R 13/62938 |
| 2022/0320797 | A1* | 10/2022 | Hirota | H01R 13/62938 |
| 2023/0079583 | A1* | 3/2023 | Kanbara | H01R 13/62955<br>439/489 |
| 2023/0107655 | A1* | 4/2023 | Mizutani | H01R 13/707<br>439/157 |
| 2023/0299540 | A1* | 9/2023 | Nozaki | H01R 13/641<br>439/157 |

* cited by examiner

LEVER-TYPE CONNECTOR

CROSS-REFERENCE TO RELATED APPLICATIONS

This application is based on and claims priority from Japanese Patent Application No. 2023-029415, filed on Feb. 28, 2023, with the Japan Patent Office, the disclosure of which is incorporated herein in its entirety by reference.

TECHNICAL FIELD

The present disclosure relates to a lever-type connector.

BACKGROUND

Conventionally, a lever-type connector is known from Japanese Patent Laid-open Publication No. 2010-160942. This lever-type connector is provided with a female housing, a lever to be mounted on the female housing rotatably about a rotation center axis, a male housing to be properly connected to the female housing by the rotation of the lever to a proper connection position and a detecting member. The female housing includes a lock protrusion. The lever includes a lock arm on an end part distant from the rotation center axis. The lock arm holds the both housings in a properly connected state by being locked to the lock protrusion.

The detecting member is provided movably between a standby position and a detection position with respect to the lever. The detecting member is locked by the lock arm and kept at the standby position while the both housings are being connected. On the other hand, the detecting member is pressed by the lock protrusion locked to the lock arm and becomes movable to the detection position when the both housings are properly connected (when the lever is at the proper connection position).

At the proper connection position, the lever is in a retracted posture in which the lock arm is locked to the lock protrusion of the female housing and a projection amount from the female housing is suppressed to be small. Thus, if the lever is locked to the female housing at the proper connection position, the lever does not project from the female housing and the interference of the lever with another connector, an external matter or the like is easily avoided. For example, in transporting the lever-type connector before female terminal fittings are accommodated thereinto from a connector process to a harness process, the lever is preferably at the proper connection position to avoid interference with another connector, an external matter or the like.

SUMMARY

However, if the lever is at the proper connection position, the detecting member is in a state movable from the standby position to the detection position by being pressed by the lock protrusion. Thus, there is a concern that another connector, an external matter or the like contacts the detecting member during the above transportation and the detecting member inadvertently moves to the detection position. If the detecting member moves to the detection position, the detecting member has to be returned to the standby position when the lever-type connector is received at the harness process, thereby increasing man-hours.

The present disclosure was completed on the basis of the above situation and aims to prevent a detecting member from inadvertently moving from a standby position to a detection position during transportation.

The present disclosure is directed to a lever-type connector connectable to a mating connector, the lever-type connector being provided with a housing, a lever mounted on the housing movably to a temporary locking position and a complete locking position, and a detecting member mounted on the lever movably to a standby position and a detection position, the lever-type connector and the mating connector reaching a connection completed state by moving the lever from the temporary locking position to the complete locking position, a transportation position being set between the temporary locking position and the complete locking position in a movement path of the lever, the lever including a lever lock portion and a transportation lock portion, the housing including a complete locking portion for holding the lever at the complete locking position by being locked to the lever lock portion and a temporary locking portion for holding the lever at the transportation position by being locked to the transportation lock portion, and the detecting member being held at the standby position by being locked by the lever lock portion at the transportation position, the detecting member being allowed to move from the standby position to the detection position by releasing locking with the lever lock portion by the complete locking portion at the complete locking position.

According to the present disclosure, it is possible to prevent a detecting member from inadvertently moving from a standby position to a detection position during transportation.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
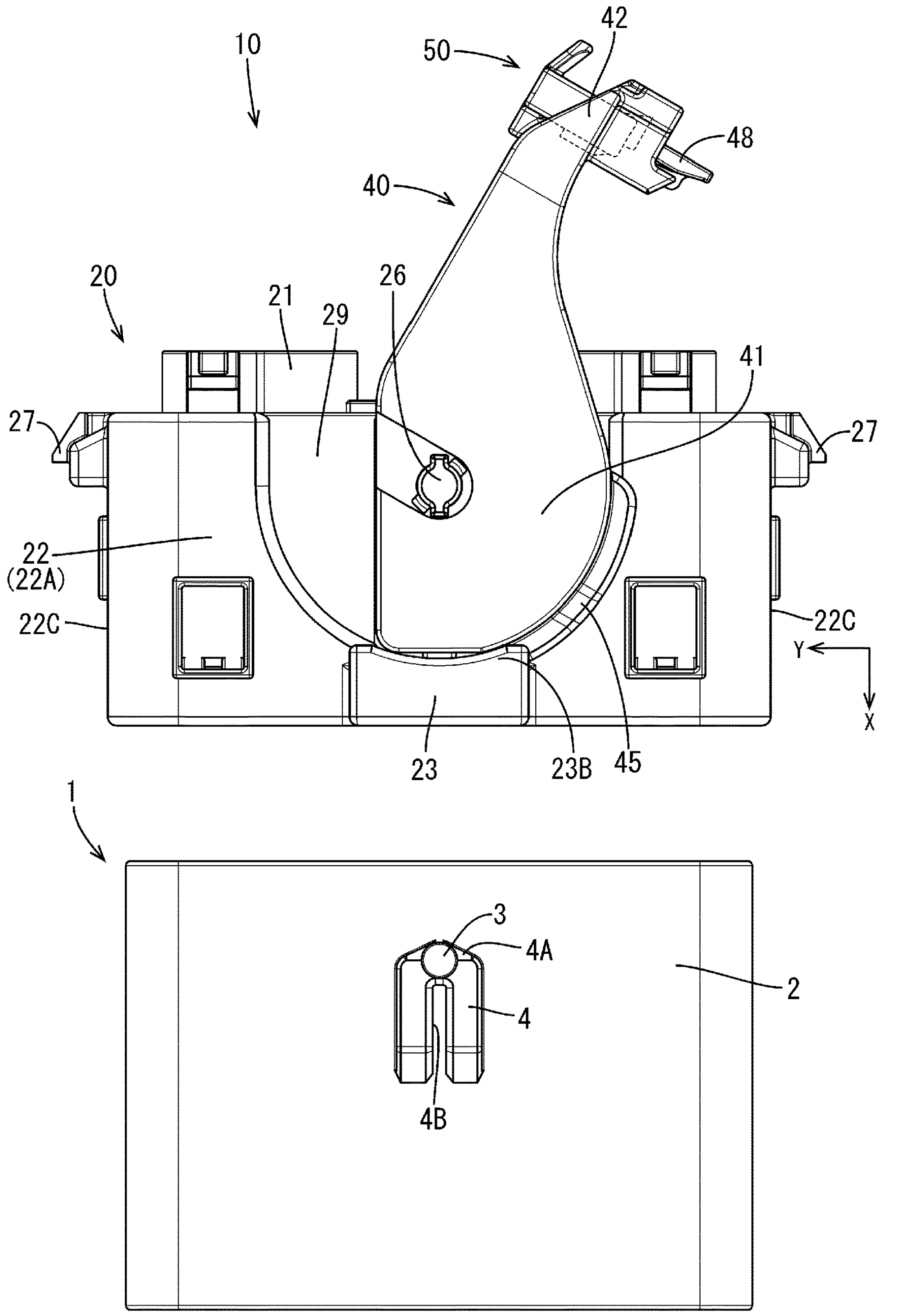
FIG. 1 is a side view showing a state before a lever-type connector and a mating connector are connected.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

[1] The lever-type connector of the present disclosure is connectable to a mating connector and provided with a housing, a lever mounted on the housing movably to a temporary locking position and a complete locking position, and a detecting member mounted on the lever movably to a standby position and a detection position, the lever-type connector and the mating connector reaching a connection completed state by moving the lever from the temporary locking position to the complete locking position, a transportation position being set between the temporary locking position and the complete locking position in a movement path of the lever, the lever including a lever lock portion and a transportation lock portion, the housing including a complete locking portion for holding the lever at the complete locking position by being locked to the lever lock portion and a temporary locking portion for holding the lever at the transportation position by being locked to the transportation lock portion, and the detecting member being held at the standby position by being locked by the lever lock portion at the transportation position, the detecting member being allowed to move from the standby position to the detection position by releasing locking with the lever lock portion by the complete locking portion at the complete locking position.

For example, in transporting the lever-type connector from a connector process to a harness process, the lever is moved to the transportation position. The lever is held on the housing by locking the transportation lock portion to the temporary locking portion of the housing at the transportation position. If the lever is held on the housing at the transportation position, a projection amount of the lever from the housing can be smaller than that at the temporary locking position. Thus, the interference of the lever with another connector, an external matter or the like is easily avoided. Here, since the detecting member is held at the standby position by the lever lock portion at the transportation position, the detecting member can be prevented from inadvertently moving from the standby position to the detection position during transportation.

[2] In [1] described above, preferably, the lever is rotatable between the temporary locking position and the complete locking position, an opening suppressing rib is provided to extend in a rotation direction of the lever on an outer peripheral edge of the lever, the housing includes a guide wall facing an outer surface of the housing, an accommodation groove is formed between the guide wall and the outer surface of the housing and the lever is suppressed from being opened and deformed by accommodating the opening suppressing rib into the accommodation groove, and the transportation lock portion is provided in a region adjacent to the opening suppressing rib.

By accommodating the opening suppressing rib into the accommodation groove in rotating the lever, the opening deformation of the lever is suppressed and the detachment of the lever from the housing is suppressed. In this way, the locking of the transportation lock portion and the temporary locking portion is maintained.

[3] In [2] described above, preferably, the opening suppressing rib includes a first rib proximate to the guide wall and a second rib disposed to be more distant from the guide wall than the first rib, the first rib is accommodated in the accommodation groove at the transportation position, the first rib comes out from the accommodation groove as the lever approaches the transportation position, and the transportation lock portion is provided in a region corresponding to the second rib in the rotation direction of the lever, out of the region adjacent to the opening suppressing rib.

Since the first rib comes into contact with the guide wall at the transportation position, the locking of the transportation lock portion and the temporary locking portion is maintained and an erroneous movement of the lever to the complete locking position can be suppressed. Since the first rib comes out from the accommodation groove and the second rib is displaced in a direction toward the guide wall as the lever approaches the temporary locking position, the opening deformation of the lever is allowed, whereby the locking of the transportation lock portion and the temporary locking portion can be released.

[4] In [3] described above, preferably, the opening suppressing rib further includes a third rib coupling the first rib and the second rib, the third rib extending in a direction oblique to the rotation direction of the lever.

Since the first and second ribs are coupled by the third rib, a gradual transition can be made from a state where the first and second ribs are accommodated in the accommodation groove to a state where only the second rib is accommodated in the accommodation groove.

[5] In [3] or [4] described above, preferably, the lever has an inner surface facing the outer surface of the housing and an outer surface disposed on a side opposite to the inner surface, the second rib is connected to the inner surface to be flush with the inner surface and the first rib is connected to the outer surface via a step, and the guide wall is disposed along the step with the first rib accommodated in the accommodation groove.

Since the second rib is connected to the inner surface of the lever to be flush with the inner surface, a thickness (dimension from the inner surface to the outer surface) of the lever can be reduced as compared to the case where the second rib is connected to the inner surface of the lever via a step. Further, since the guide wall is disposed along the step, a projection amount of the guide wall from the outer surface of the housing can be suppressed as compared to the case where the lever is not provided with the step.

Details of Embodiment of Present Disclosure

A specific example of a lever-type connector of the present disclosure is described below with reference to the drawings. For the convenience of description, some components may be shown in an exaggerated or simplified manner in each drawing. Further, a dimension ratio of each part may be different in each figure. Further, "parallel", "perpendicular" and "orthogonal" in this specification mean not only strictly parallel, perpendicular and orthogonal, but also substantially parallel, perpendicular and orthogonal within a range in which functions and effects in this embodiment are achieved.

In each figure, three directions perpendicular to each other are shown and these three directions are respectively shown as a front-rear direction X, a lateral direction Y and a vertical direction Z. That is, the front-rear direction X and the lateral direction Y are perpendicular to each other, the lateral direction Y and the vertical direction Z are perpendicular to each other, and the vertical direction Z and the front-rear direction X are perpendicular to each other. The front-rear direction X is based on a connection direction of each connector, a connection surface side of each connector is a front side, and the lateral direction Y and the vertical direction Z are based on a vertical direction and a lateral direction when viewed from the connection surface side.

Further, a term "tubular" used in the description of this specification indicates not only a shape formed by a peripheral wall continuous over an entire periphery in a circumferential direction, but also a shape formed by combining a plurality of components and a shape having a cut or the like in a circumferential part such as a C shape. Further, the "tubular" shapes include circular shapes, elliptical shapes and polygonal shapes with angular or rounded corners.

Further, a term "ring" in this specification means an arbitrary closed shape having an outer edge connected by straight lines or curves, including a circular ring having a circular outer edge, a ring having an elliptical or oval outer edge, a polygonal ring having a polygonal outer edge and a ring having a polygonal outer edge with rounded corners. The "ring" may be shaped such that an outer edge shape and an inner edge shape have the same shape or may be shaped such that an outer edge shape and an inner edge shape are different. The "ring" may have a predetermined length along a center axis direction, and the length does not matter. Further, an "annular shape" in this specification only has to be regarded as a ring as a whole and may include a cut, a slit or the like in a part such as a C shape.

Further, "facing each other" in this specification indicates that surfaces or members are at positions in front of each other, and means not only a case where the surfaces or members are at positions perfectly in front of each other, but also a case where the surfaces or members are partially in front of each other. Further, "facing each other" in this specification means both a case where another member different from two parts is interposed between the two parts and a case where nothing is interposed between the two parts.

Embodiment (Configurations of Mating Connector 1 and Lever-Type Connector 10)

Figure 5A:
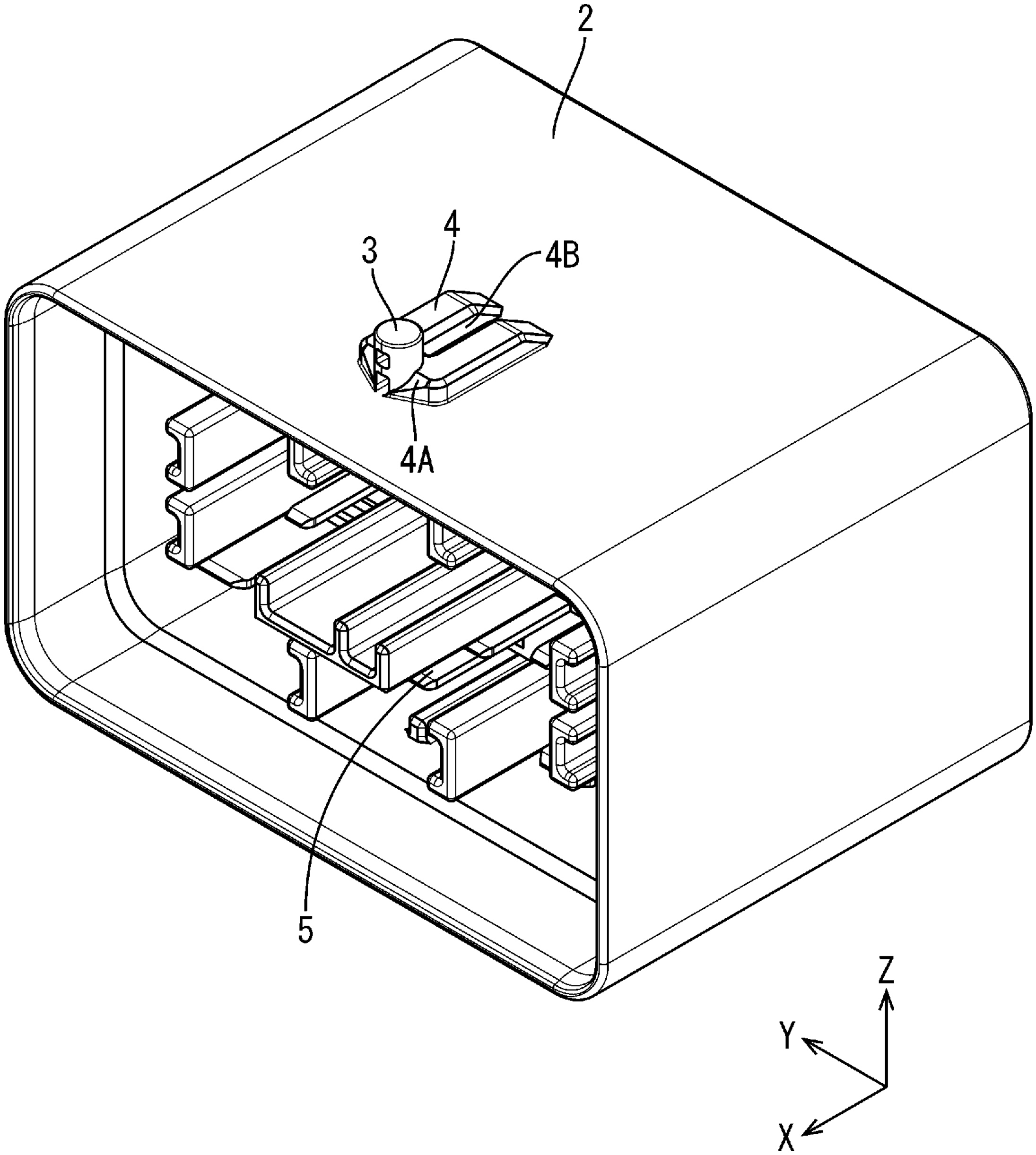
FIG. 5A is a perspective view of the mating connector when viewed obliquely from front.

A lever-type connector 10 is a connector connectable to a mating connector 1. As shown in FIG. 5A, the mating connector 1 is provided with a mating housing 2 for holding male terminals 5. The mating housing 2 has a tubular shape open forward.

Figure 5B:
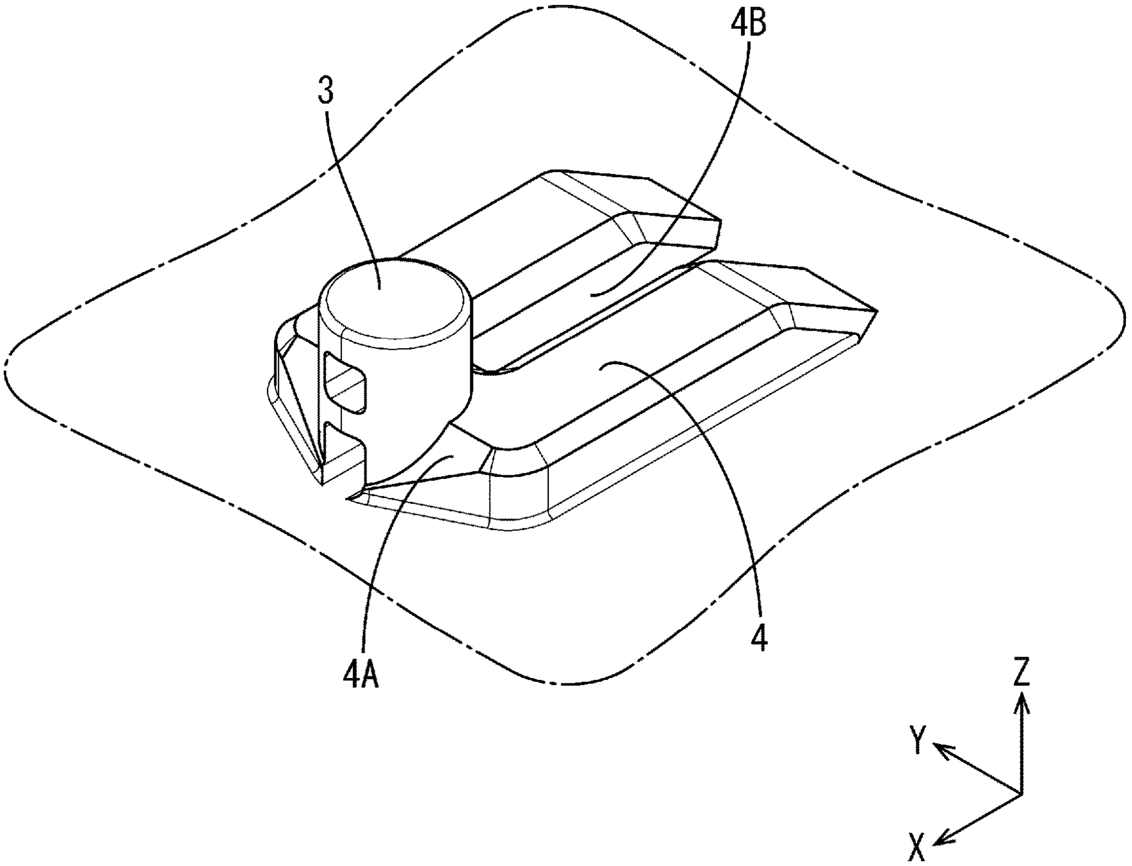
FIG. 5B is a perspective view enlargedly showing the vicinity of a base of FIG. 5A.

One cam pin 3 is provided on each of the upper and lower surfaces of the mating connector 2. As shown in FIG. 5B, the cam pin 3 has a cylindrical shape and projects in the vertical direction. A base 4 is provided near the cam pin 3. The base 4 is formed to extend rearward from the cam pin 3. A tapered surface 4A is formed on a front end part of the base 4. Further, a slit 4B is formed behind the cam pin 3 in the base 4. A resin material can be cited as a material of the mating housing 2.

As shown in FIG. 1, the lever-type connector 10 is provided with a housing 20, a lever 40 mounted on the housing 20 and the detecting member 50 mounted on the lever 40. A resin material can be cited as a material for the housing 20, the lever 40 and the detecting member 50.

(Configuration of Housing 20)

Figure 6:
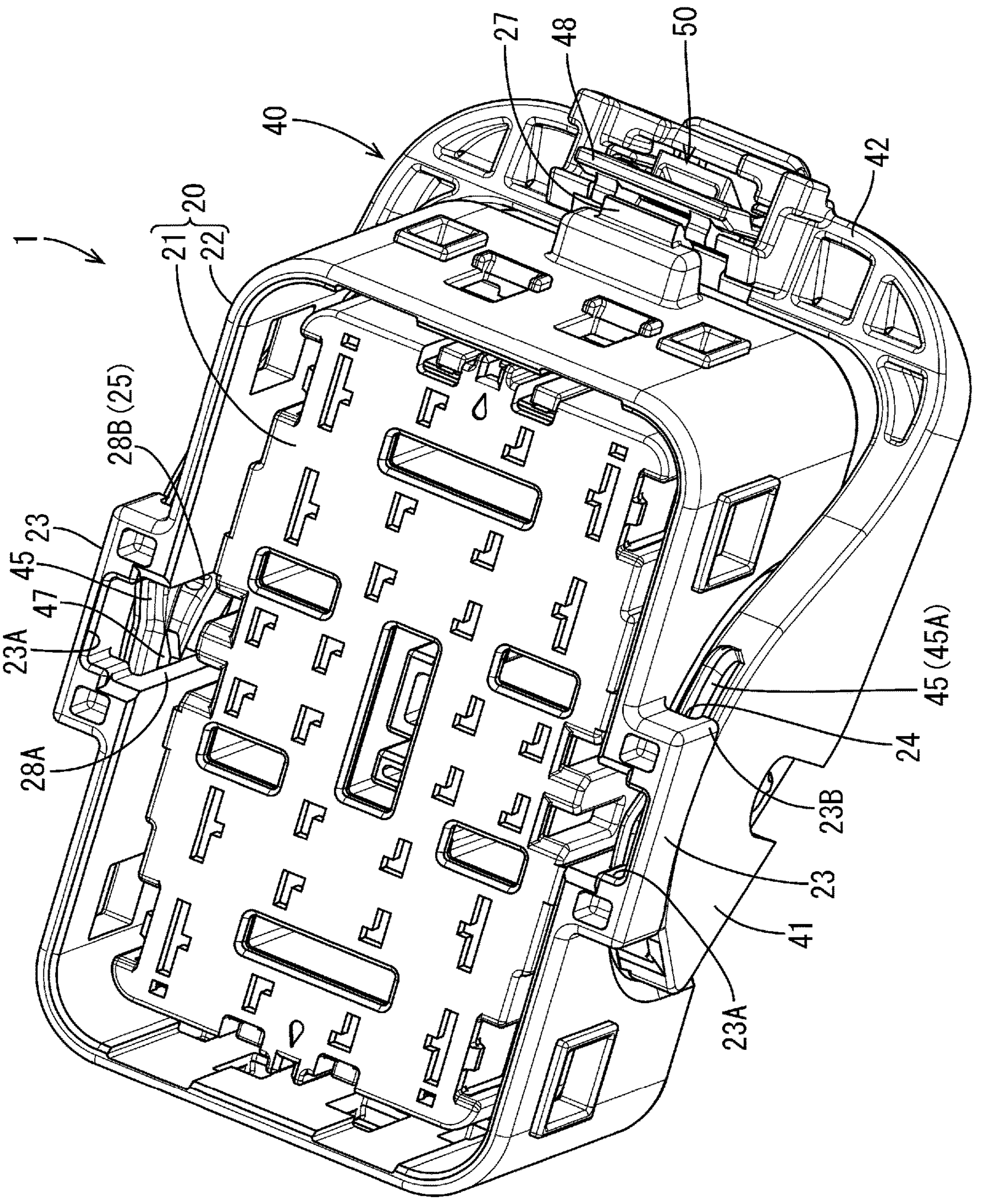
FIG. 6 is a perspective view of the lever-type connector with the lever located at the transportation position when viewed obliquely from front.

As shown in FIG. 6, the housing 20 is provided with a housing body portion 21 for accommodating and holding female terminals (not shown) to be connected to the male terminals 5 inside and a receptacle 22 in the form of a rectangular tube formed around the housing body portion 21. As shown in FIG. 1, the receptacle 22 has a rectangular outer shape long in the lateral direction and is open forward. If the connector 10 and the mating connector 1 are connected, the housing body portion 21 is fit to an inner peripheral side of the mating housing 2 and the receptacle 22 is fit to an outer peripheral side of the mating housing 2.

Figure 10:
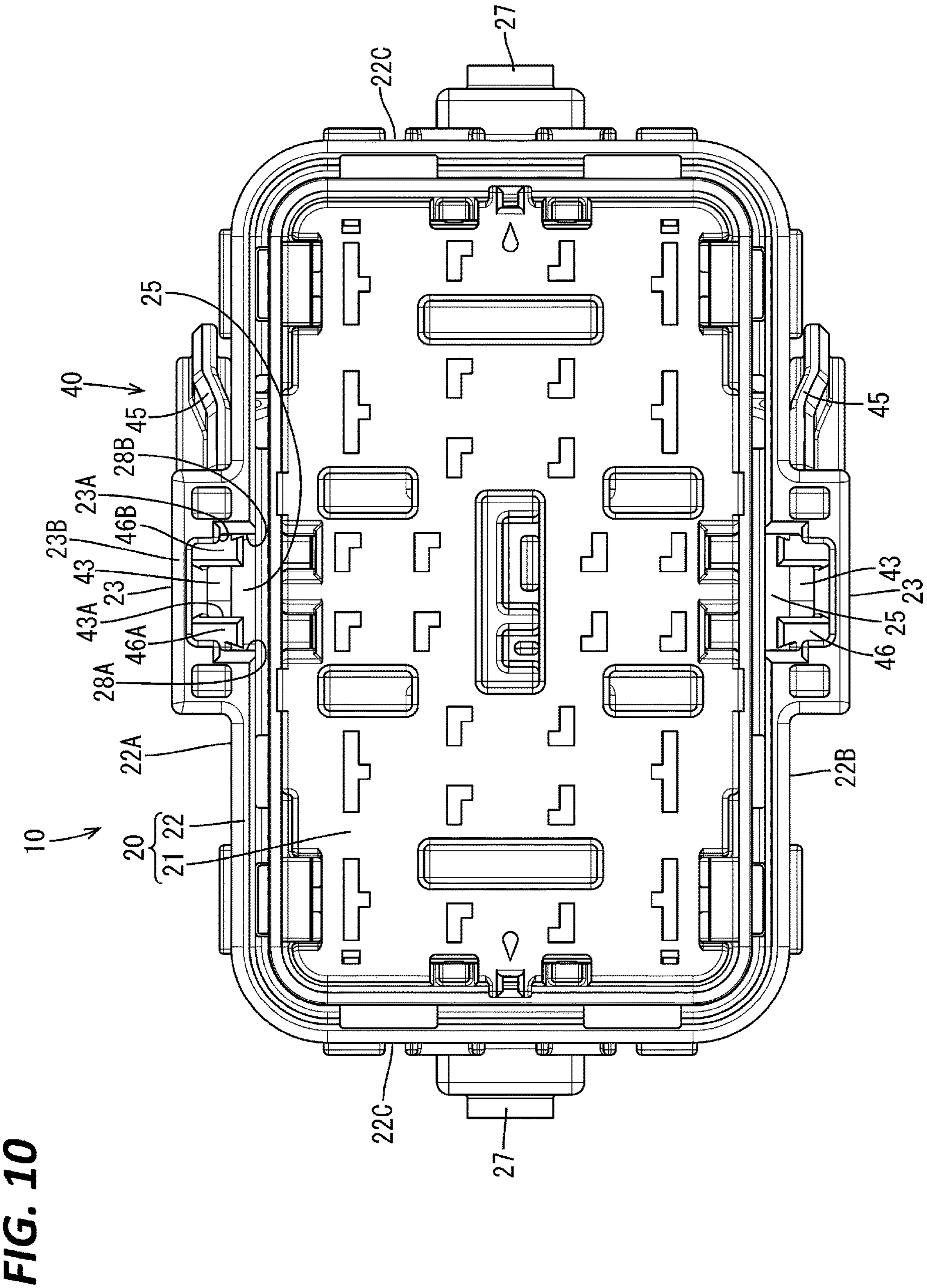
FIG. 10 is a front view of the lever-type connector with the lever located at a temporary locking position.

As shown in FIG. 10, the outer surface of the receptacle 22 is composed of an upper surface 22A, a lower surface 22B and a pair of side surfaces 22C. An opening preventing portion 23 is formed to project in the vertical direction on each of the upper and lower surfaces 22A, 22B of the receptacle 22. The opening preventing portion 23 has a rectangular outer shape long in the lateral direction when viewed from front. An opening 23A, into which the cam pin 3 and the base 4 of the mating connector 1 are inserted, is provided in the front surface of the opening preventing portion 23.

Figure 12:
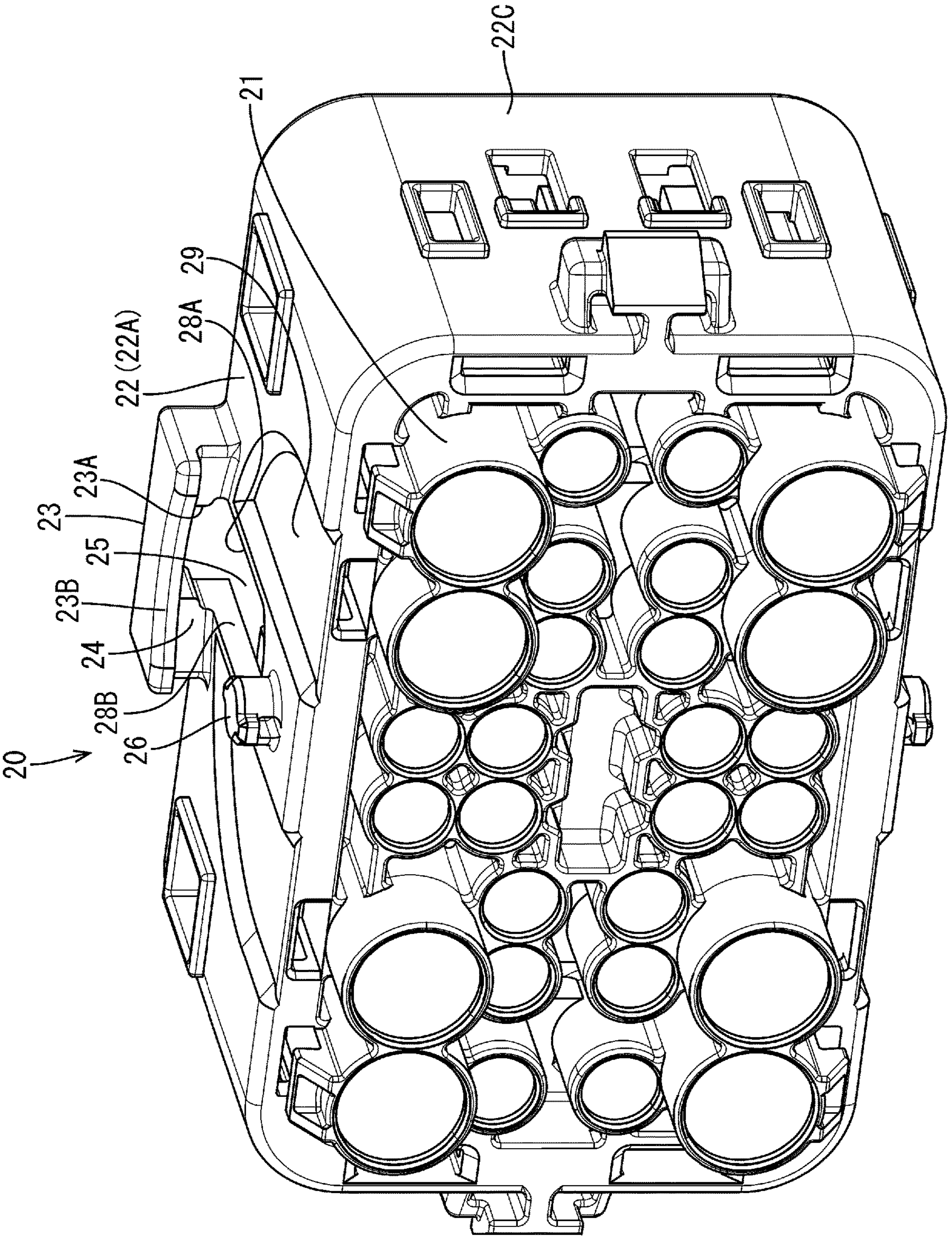
FIG. 12 is a perspective view of a housing when viewed obliquely from behind.

As shown in FIG. 12, a guide wall 23B is formed to project rearward on the rear surface of the opening preventing portion 23. The guide wall 23B is located on a projecting end part of the opening preventing portion 23 most distant from the outer surface of the receptacle 22. The upper guide wall 23B and the upper surface 22A of the receptacle 22 are arranged to face each other in the vertical direction, and the lower guide wall 23B and the lower surface 22B of the receptacle 22 are arranged to face each other in the vertical direction. Accommodation grooves 24 are formed respectively between the upper guide wall 23B and the upper surface 22A of the receptacle 22 and between the lower guide wall 23B and the lower surface 22B of the receptacle 22.

Cuts 25 for allowing the entrance of the cam pins 3 and the bases 4 are respectively formed behind the opening preventing portions 23 in the upper and lower surfaces 22A, 22B of the receptacle 22. The cuts 25 of the receptacle 22 communicate with the openings 23A of the opening preventing portions 23. A rotary shaft 26 for rotatably supporting the lever 40 is formed to project in the vertical direction behind the cut 25 on each of the upper and lower surfaces 22A, 22B of the receptacle 22.

A complete locking portion 27 is formed to project in the lateral direction on each of the both side surfaces 22C of the receptacle 22. The lever 40 can be selectively mounted in a bilaterally symmetrical posture on the housing 20. Accordingly, the left complete locking portion 27 is used when the lever 40 is mounted in a leftward facing posture, and the right complete locking portion 27 is used when the lever 40 is mounted in a rightward facing posture. In this embodiment, the lever 40 is illustrated to be mounted in the rightward facing posture.

Figure 11:
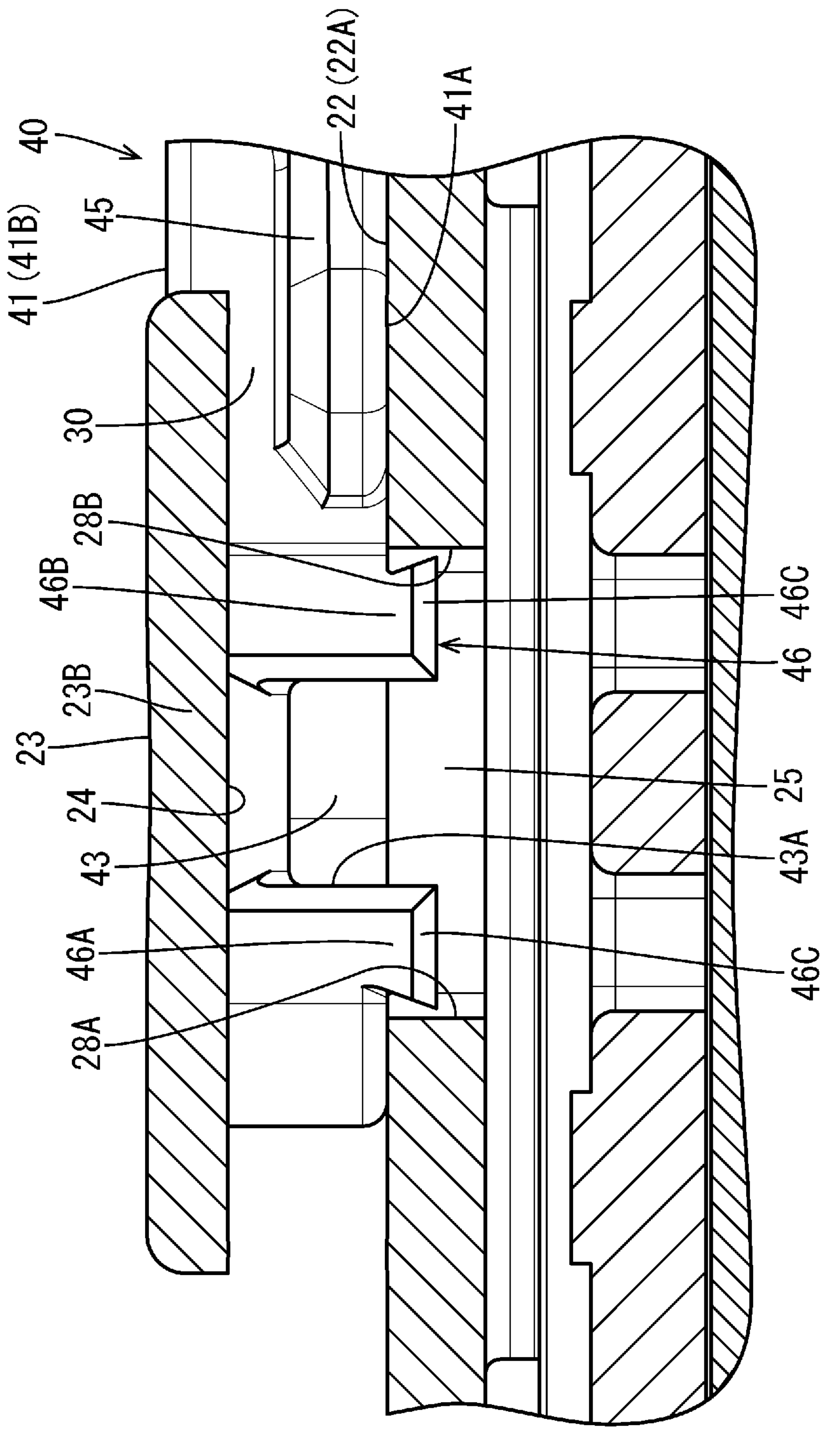
FIG. 11 is a front view in section showing a state where a temporary lock portion is locked to the left temporary locking portion and the right temporary locking portion.

Further, as shown in FIG. 11, the cut 25 of the receptacle 22 is formed between a left temporary locking portion 28A and a right temporary locking portion 28B. The left and right temporary locking portions 28A, 28B are facing each other in the lateral direction.

An escaping recess 29 is formed in an arcuate region centered on the rotary shaft 26 in each of the upper and lower surfaces 22A, 22B of the receptacle 22. The upper escaping recess 29 is formed to be recessed downward from the upper surface 22A of the receptacle 22, and the lower escaping recess 29 is formed to be recessed upward from the lower surface 22B of the receptacle 22. The escaping recess 29 has a space for accommodating a temporary lock portion 46 and a transportation lock portion 47 to be described later to avoid the interference of the temporary lock portion 46 and the transportation lock portion 47 with the upper or lower surface 22A, 22B of the receptacle 22 when the lever 40 is mounted on the housing 20 and rotated.

The escaping recess 29 is divided into left and right sections at the position of the cut 25. Out of the escaping recess 29, an escaping recess 29 on a left side when viewed from the connection surface may be referred to as a left escaping recess 29 and an escaping recess 29 on a right side when viewed from the connection surface may be referred to as a right escaping recess 29.

(Configuration of Lever 40)

Figure 13:
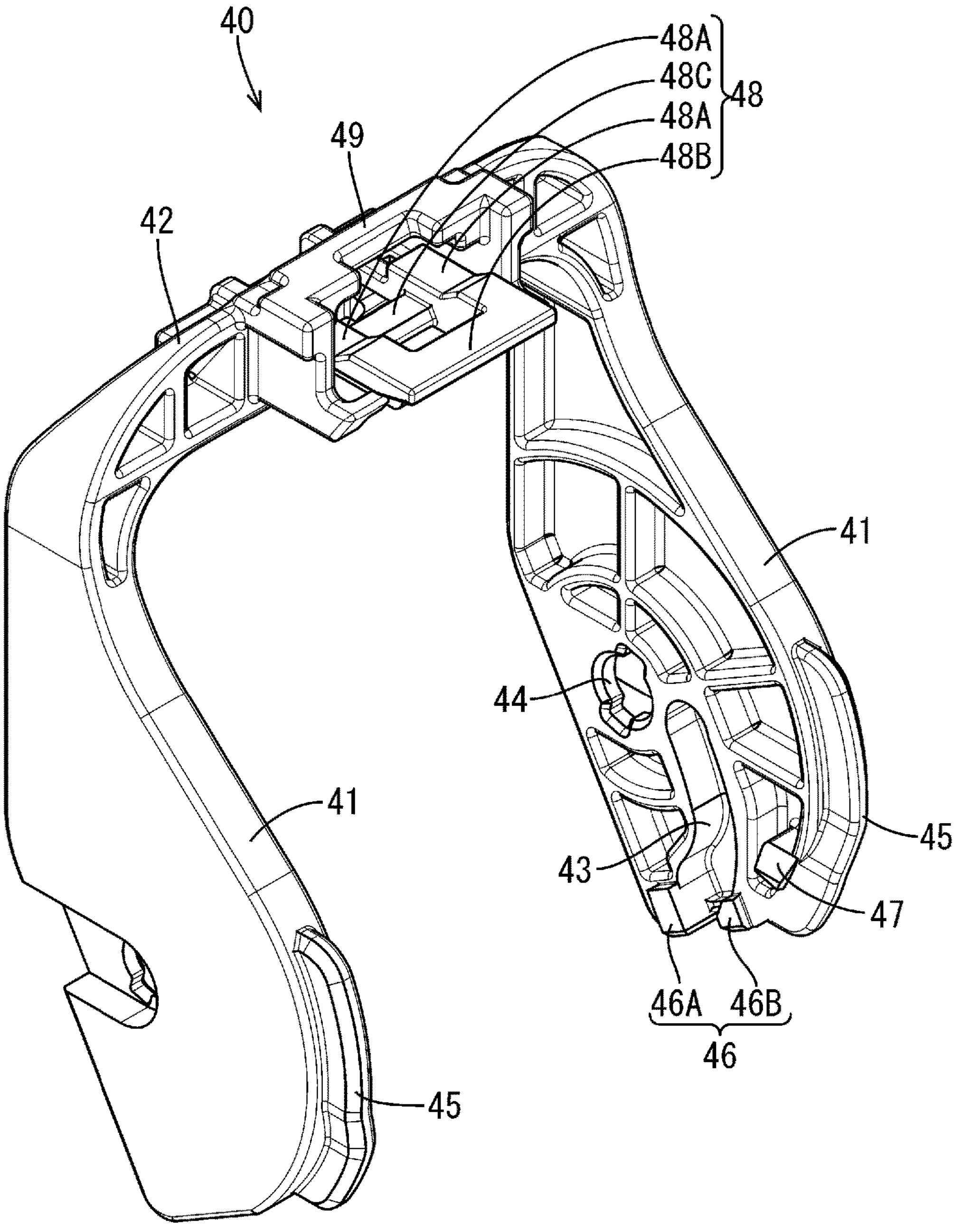
FIG. 13 is a perspective view of the lever when viewed obliquely from behind.

As shown in FIG. 13, the lever 40 is provided with plate-like cam plates 41 each formed with a cam groove 43, and an operating portion 42. A pair of the cam plates 41 are provided, and the lever 40 is gate-shaped as a whole by coupling end parts of the pair of cam plates 41 by the operating portion 42 (see FIG. 15).

Figure 16:
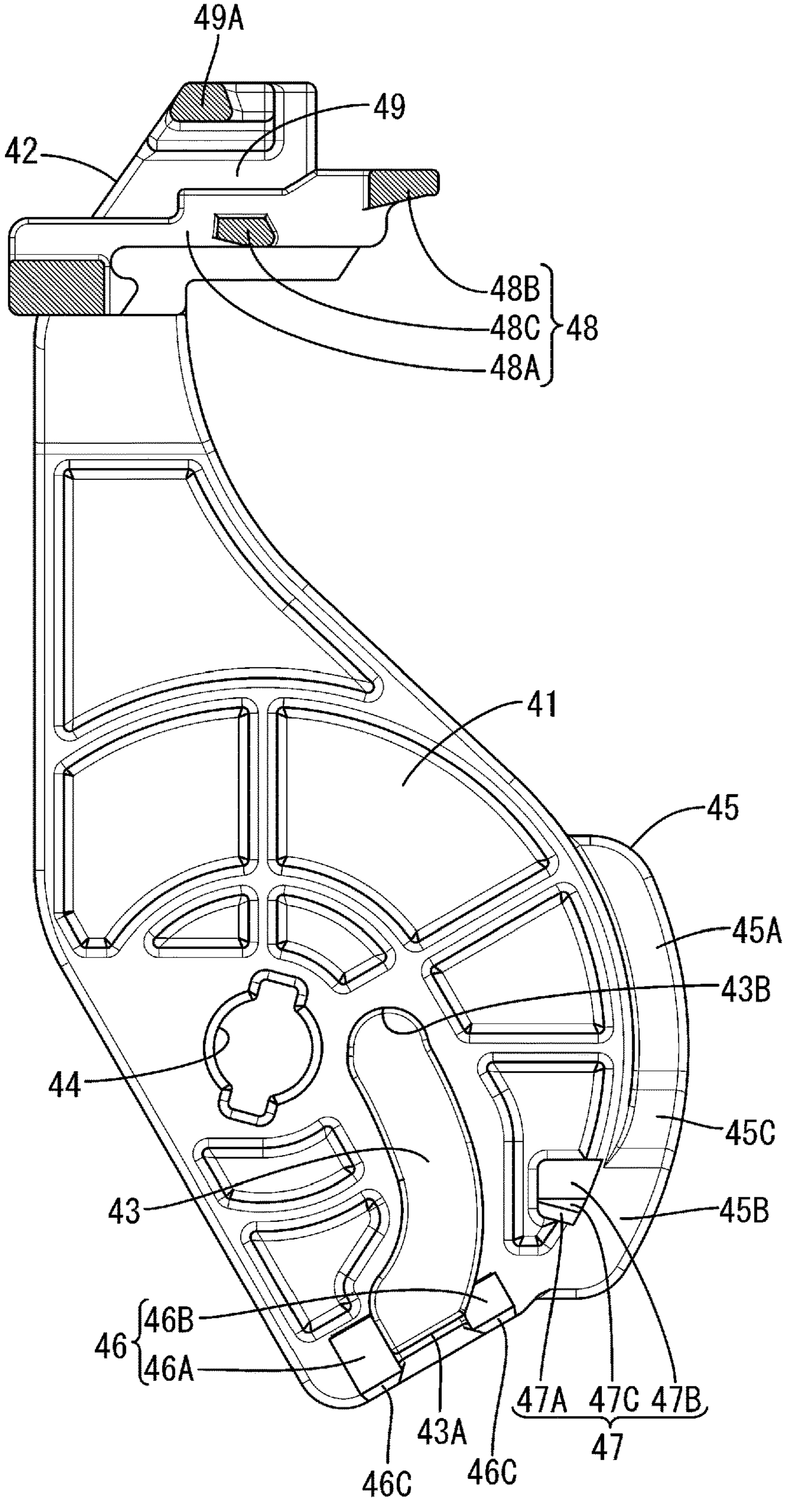
FIG. 16 is a section along A-A of FIG. 15.

As shown in FIG. 16, a rotation hole 44, into which the rotary shaft 26 is inserted, is formed to penetrate in a plate thickness direction near a center of the cam plate 41. The cam groove 43 is formed between an entrance 43A open in the outer edge of the cam plate 41 and a back end 43B located near the rotation hole 44. The cam groove 43 is formed to approach the rotation hole 44 from the entrance 43A toward the back end 43B.

Figure 2:
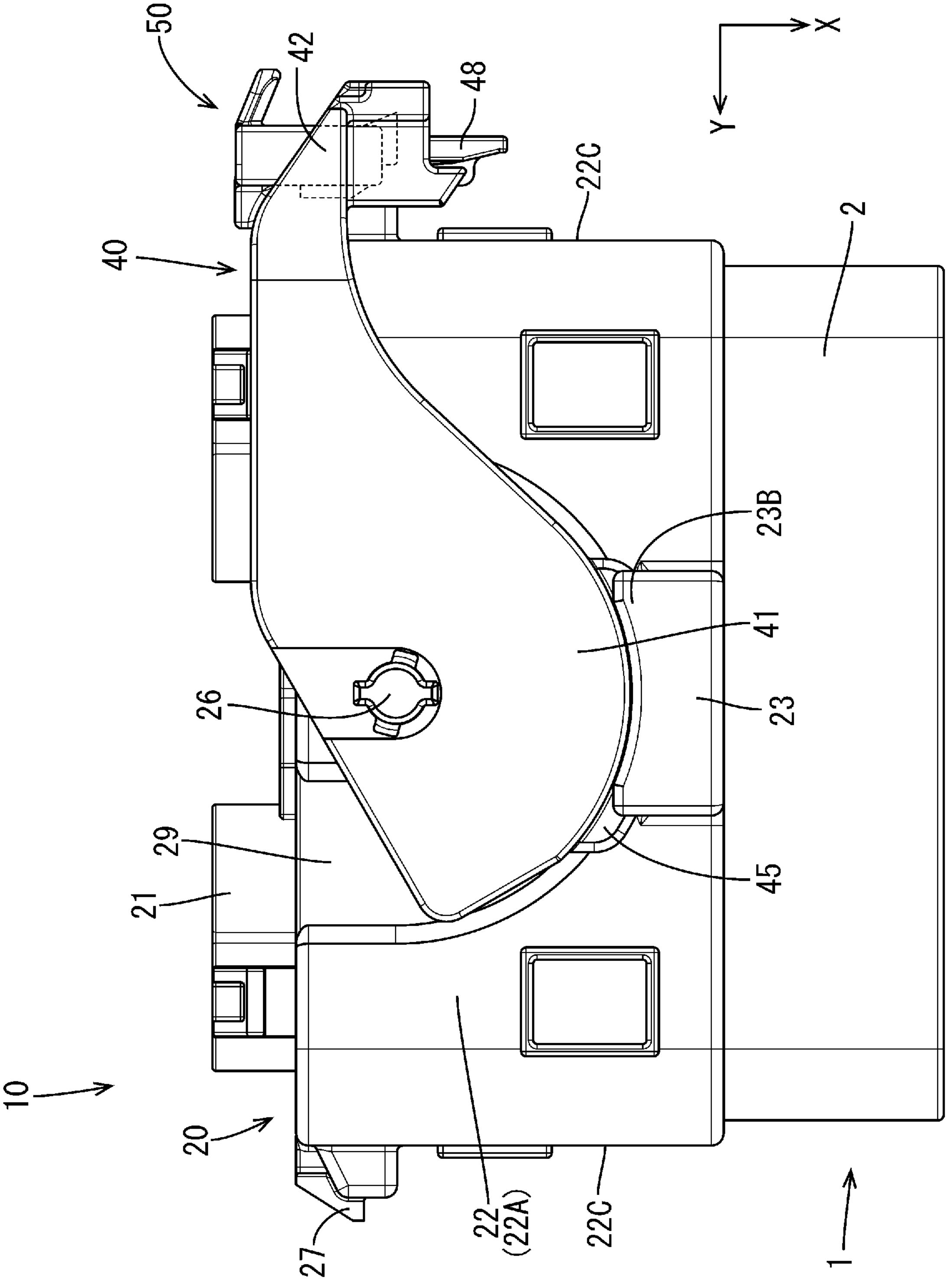
FIG. 2 is a side view showing a state where the lever-type connector and the mating connector are in a connection completed state and a detecting member is at a standby position.

The lever 40 is movable to a temporary locking position shown in FIG. 1 and a complete locking position shown in FIG. 2. The lever 40 of this embodiment is a rotary lever rotatable between the temporary locking position and the complete locking position with the rotary shafts 26 as a center of rotation. As shown in FIG. 10, when the lever 40 is at the temporary locking position, the entrances 43A of the cam grooves 43 are disposed to face forward through the openings 23A of the opening preventing portion 23. Therefore, when the mating connector 1 is manually lightly fit to the lever-type connector 10, the cam pins 3 can enter the entrances 43A of the cam grooves 43 through the openings 23A.

If the cam pins 3 enter the cam grooves 43 through the entrances 43A and the lever 40 is rotated about the rotary shafts 26, the cam pins 3 move toward the back ends 43B in the cam grooves 43 by a cam action caused by the engagement of the cam pins 3 and the inner walls of the cam grooves 43. In this way, a connecting operation of the mating connector 1 and the lever-type connector 10 proceeds.

Further, if the lever 40 is rotated in a direction opposite to the one during the connecting operation, the cam pins 3 move toward the entrances 43A in the cam grooves 43 by the cam action caused by the engagement of the cam pins 3 and the inner walls of the cam grooves 43. In this way, a separating operation of the mating connector 1 and the lever-type connector 10 proceeds.

Figure 14:
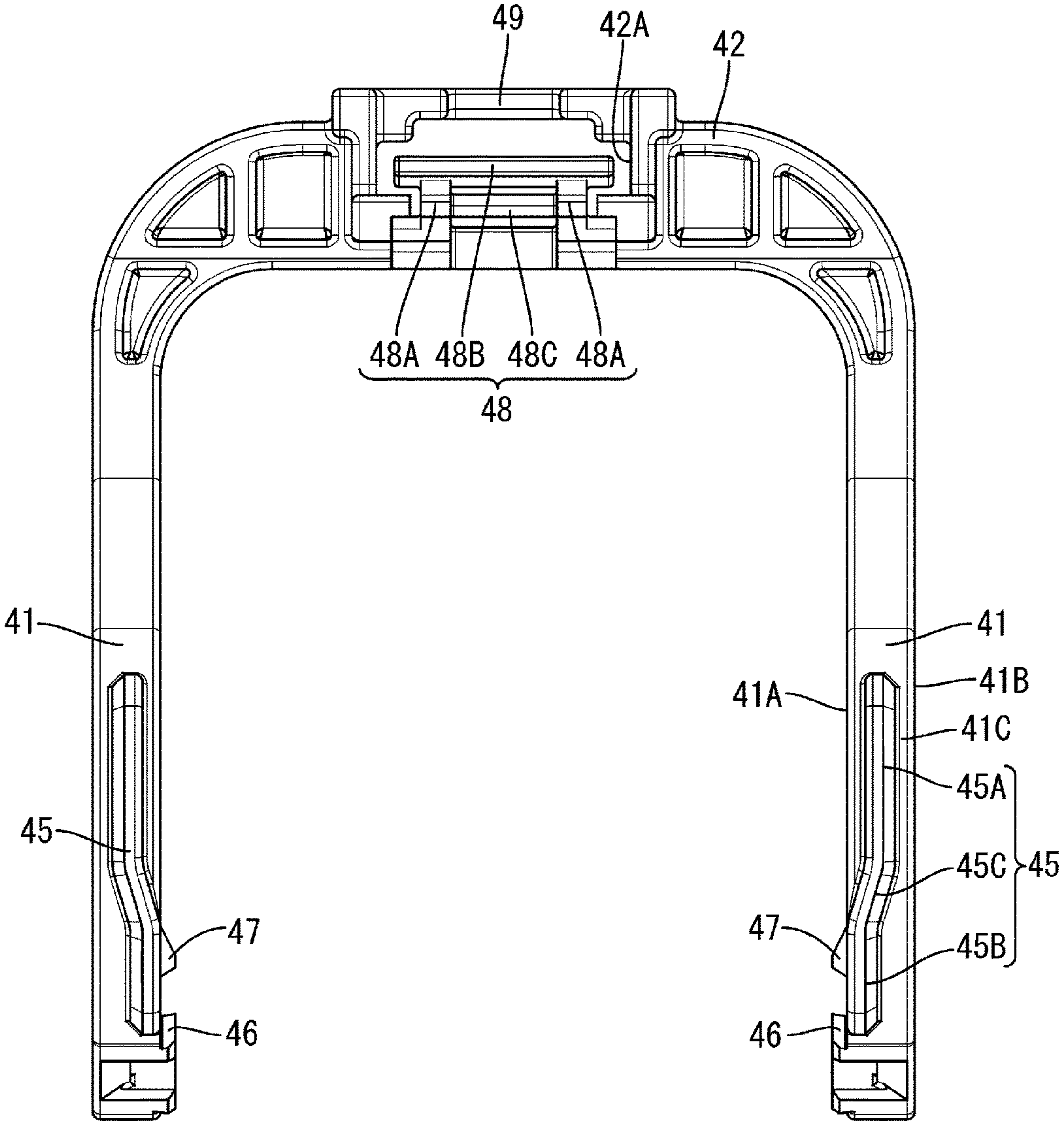
FIG. 14 is a back view of the lever.

As shown in FIG. 14, an opening suppressing rib 45 in the form of a rib extending in a rotation direction of the lever 40 is provided on the outer peripheral edge of the cam plate 41. The opening suppressing rib 45 includes a first rib 45A connected to an inner surface 41A (surface facing the upper or lower surface 22A, 22B of the receptacle 22) of the cam plate 41 to be flush with the inner surface 41A, a second rib 45B more distant from the inner surface 41A of the cam plate 41 than the first rib 45A and a third rib 45C coupling the first and second ribs 45A, 45B.

The first rib 45A is proximate to the guide wall 23B with the lever 40 mounted on the housing 20. The second rib 45B is disposed to be more distant from the guide wall 23B than the first rib 45A. The second rib 45B is located in a center in the plate thickness direction of the cam plate 41. The third rib 45C extends in a direction oblique to the rotation direction of the lever 40. The first rib 45A is connected to an outer surface 41B (surface disposed on a side opposite to the inner surface 41A) of the cam plate 41 via a step 41C.

As shown in FIG. 6, the guide wall 23B is disposed along the step 41C with the first rib 45A accommodated in the accommodation groove 24. Thus, the outer surface 41B of the cam plate 41 and the outer surface of the guide wall 23B are arranged substantially flush with each other. By doing so, a projection amount of the guide wall 23B from the upper or lower surface 22A, 22B of the receptacle 22 can be suppressed as compared to the case where the lever 40 is not provided with the step 41C.

As shown in FIG. 13, the temporary lock portion 46 is provided to project inward on both sides of the entrance 43A on the inner surface of the cam plate 41. Further, the transportation lock portion 47 is provided to project inward at a position deviated from the temporary lock portion 46 toward the opening suppressing rib 45 in the rotation direction of the lever 40 on the inner surface of the cam plate 41.

As shown in FIG. 16, the temporary lock portion 46 includes a left lock portion 46A located to the left of the entrance 43A and a right lock portion 46B located to the right of the entrance 43A. The left lock portion 46A is formed to be longer than the right lock portion 46B in an advancing direction of the cam pin 3. A tapered surface 46C is formed on each of the entrance 43A side (side opposite to the rotation hole 44) of the left lock portion 46A and the entrance 43A side (side opposite to the rotation hole 44) of the right lock portion 46B.

As shown in FIG. 16, the transportation lock portion 47 is provided in a region corresponding to the second rib 45B in the rotation direction of the lever 40, out of a region adjacent to the opening suppressing rib 45. The transportation lock portion 47 has a first temporary locking surface 47A located on the side of the temporary lock portion 46 in the rotation direction of the lever 40, a second temporary locking surface 47B located on a side opposite to the first temporary locking surface 47A and a ceiling surface 47C located between the first and second temporary locking surfaces 47A, 47B. The second temporary locking surface 47B is formed to have a gentler angle of inclination than the first temporary locking surface 47A. Thus, the second temporary locking surface 47B easily rides on the right temporary locking portion 28B.

As shown in FIG. 13, the operating portion 42 is provided with a lever lock portion 48 and a protection wall 49 surrounding the lever lock portion 48. The lever lock portion 48 includes a pair of lock pieces 48A, a releasing piece 48B coupling end parts of the pair of lock pieces 48A and a complete locking piece 48C coupling the pair of lock pieces 48A near centers.

Figure 15:
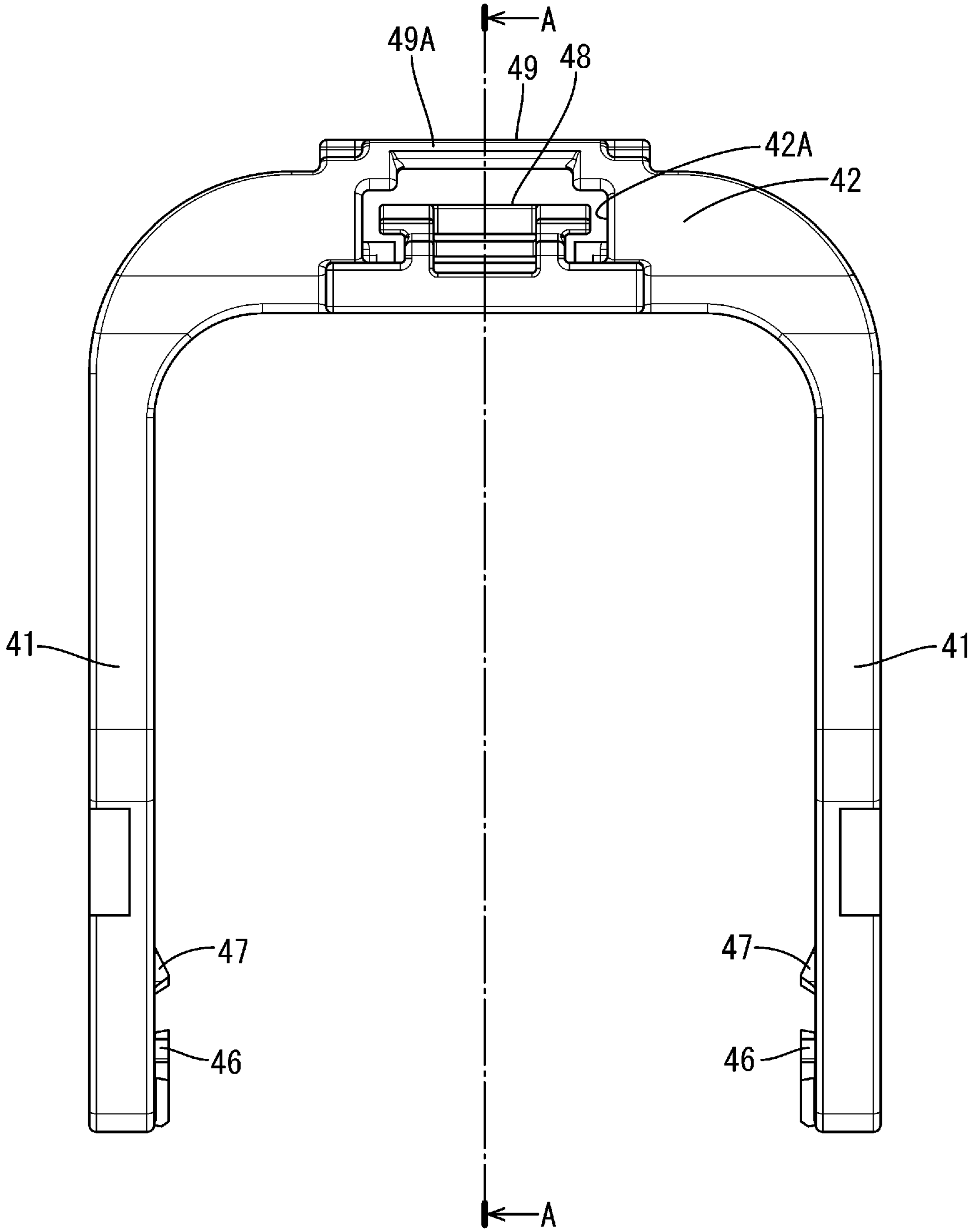
FIG. 15 is a front view of the lever.

As shown in FIG. 15, a mounting hole 42A, into which the detecting member 50 is mounted, is formed to penetrate through a central part of the operating portion 42. The lever lock portion 48 is located inside this mounting hole 42A, and a part constituting the inner wall of the mounting hole 42A serves as the protection wall 49. A part of the protection wall 49 facing the complete locking piece 48C serves as a contact portion 49, with which the detecting member 50 can come into contact at a detection position.

(Configuration of Detecting Member 50)

Figure 3:
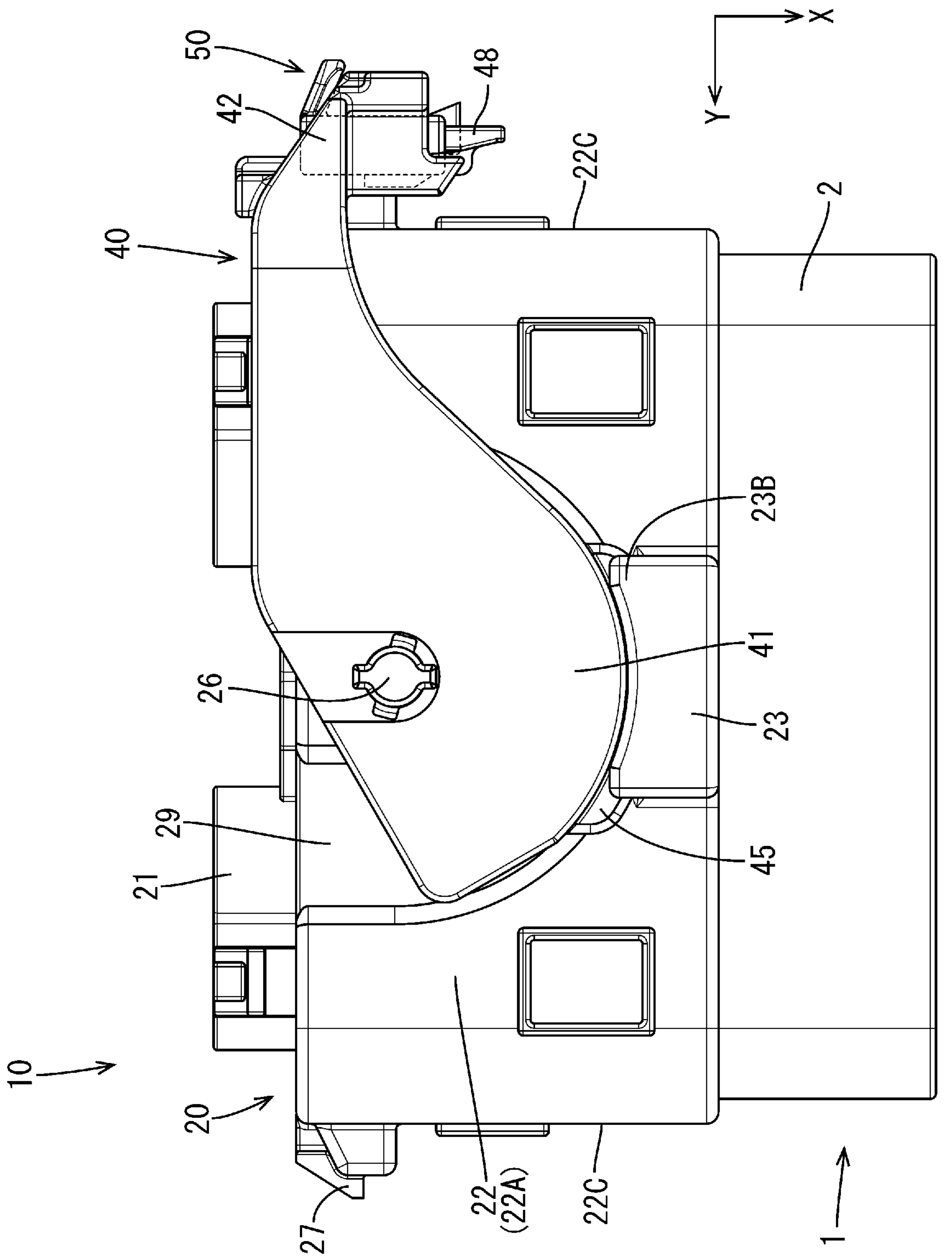
FIG. 3 is a side view showing a state where the lever-type connector and the mating connector are in the connection completed state and the detecting member is at a detection position.

The detecting member 50 is movable to a standby position shown in FIG. 2 and the detection position shown in FIG. 3 in a state mounted in the mounting hole 42A of the operating portion 42. The detecting member 50 is a member for detecting the connection completion of the mating connector 1 and the lever-type connector 10 and is allowed to be pushed from the standby position to the detection position after the lever 40 reaches the complete locking position from the temporary locking position (see FIG. 3). Therefore, the detecting member 50 is held at the standby position and prevented from moving to the detection position while the lever 40 is rotated from the temporary locking position to the complete locking position (e.g. at a transportation position).

Figure 4:
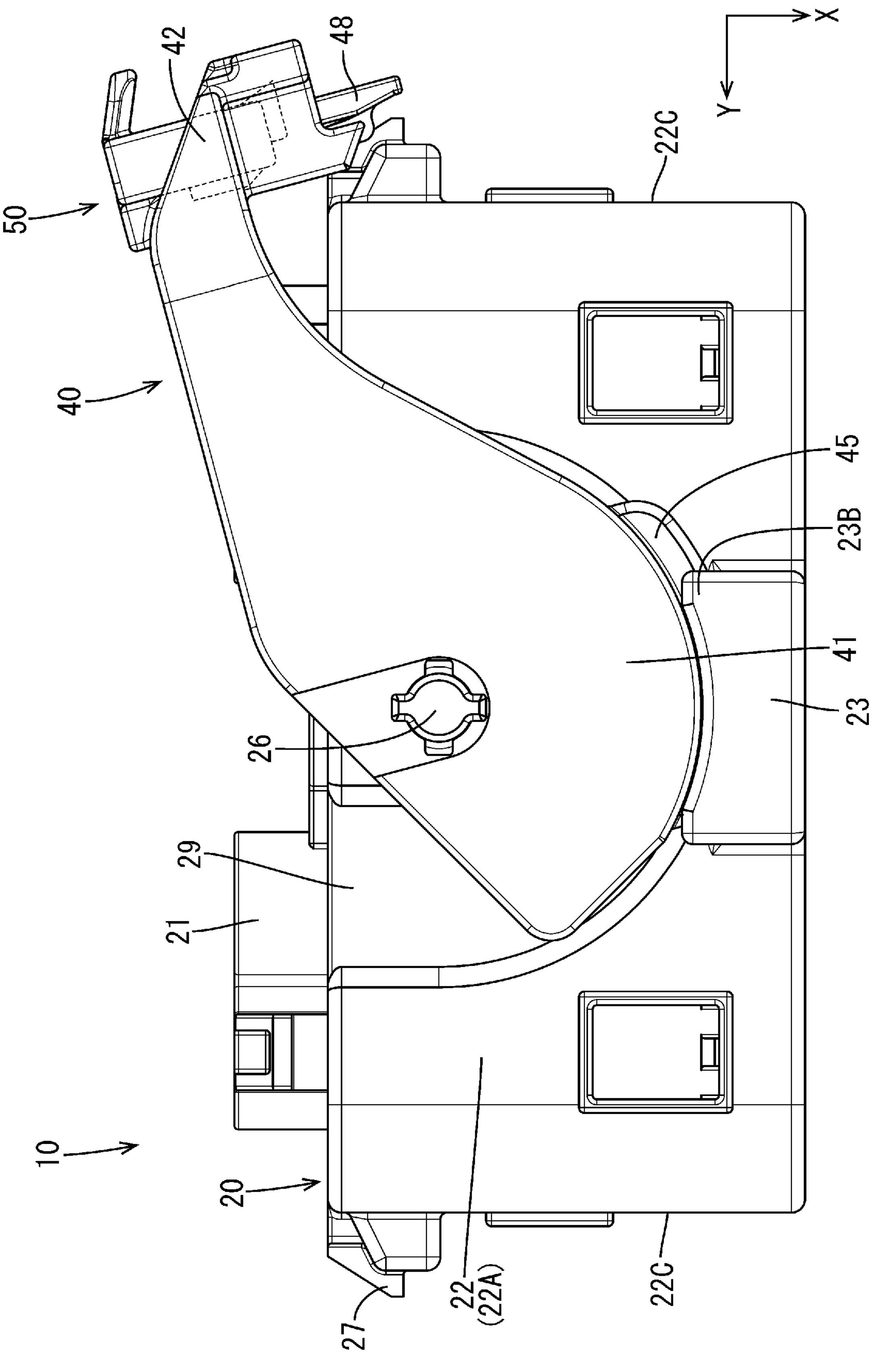
FIG. 4 is a side view of the lever-type connector with a lever located at a transportation position.
Figure 17:
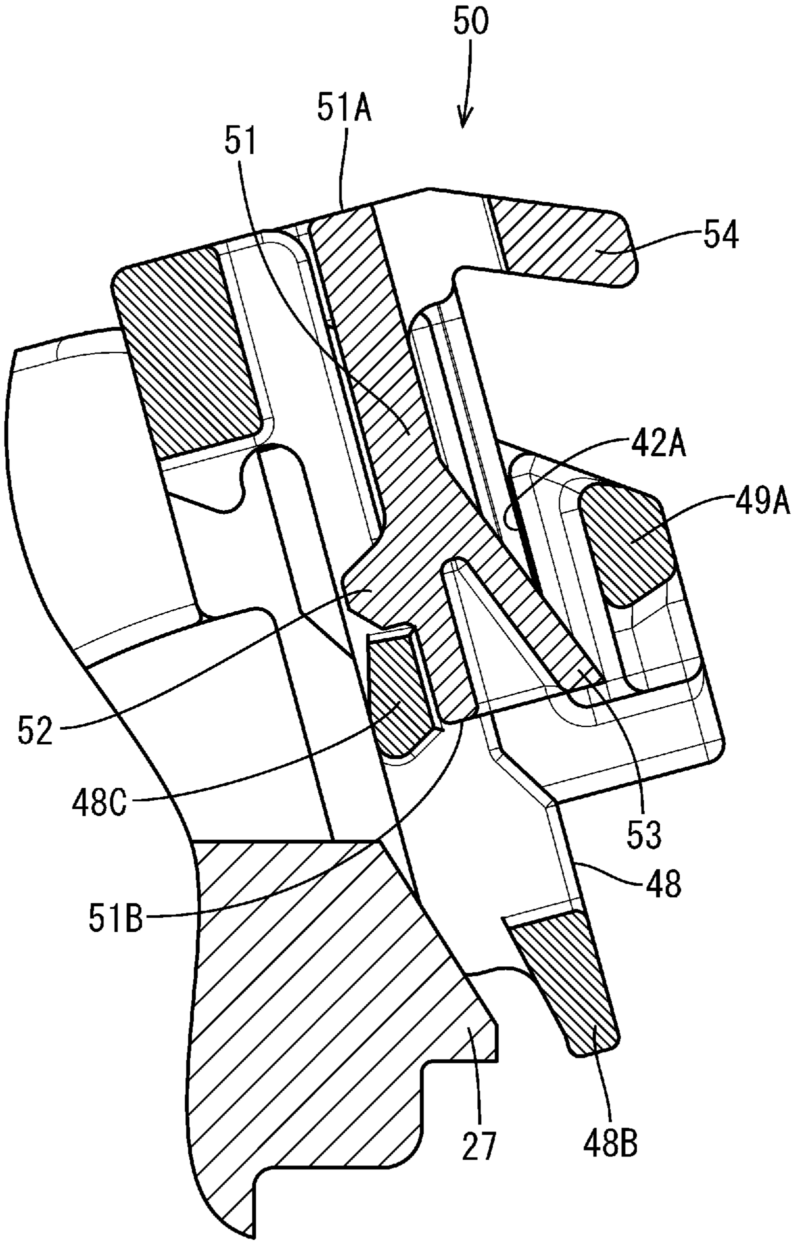
FIG. 17 is a side view in section showing a state where the detecting member is held at the standby position by being locked by a lever lock portion when the lever is at the transportation position.

FIG. 17 shows a state where the detecting member 50 is held at the standby position when the lever 40 is at the transportation position. The transportation position is the position of the lever 40 shown in FIG. 4 and located between the temporary locking position and the complete locking position. The transportation position of this embodiment is a position closer to the complete locking position than to the temporary locking position. The transportation position is a position where the lever 40 is held when the lever-type connector 10 is transported from a connector process to a harness process. Since a projection amount of the lever 40 from the housing 20 can be suppressed to be small at the transportation position, the interference of the lever-type connector 10 with another connect, an external matter or the like can be avoided.

As shown in FIG. 17, the detecting member 50 includes a detection arm 51 extending from a base end part 51A to a tip part 51B, a detecting protrusion 52 provided to project on the inner surface of the detection arm 51, a detection releasing portion 53 provided to project on the outer surface of the detection arm 51 and a front stop portion 54 provided on the base end part 51A of the detection arm 51. The detecting protrusion 52 is provided somewhat closer to the tip part 51B than a central part of the detection arm 51. The tip of the detection releasing portion 53 is provided at a position aligned with the tip part 51B of the detection arm 51, and the base end of the detection releasing portion 53 is provided somewhat closer to the base end part 51A than the detecting protrusion 52.

At the standby position shown in FIG. 17, the detecting protrusion 52 is locked to the complete locking piece 48C of the lever lock portion 48 from behind, whereby the detecting member 50 is prevented from being pushed forward. Since the complete locking piece 48C is retracted rearward of the complete locking portion 27 at the transportation position, the detecting member 52 is held at the standby position.

Figure 18:
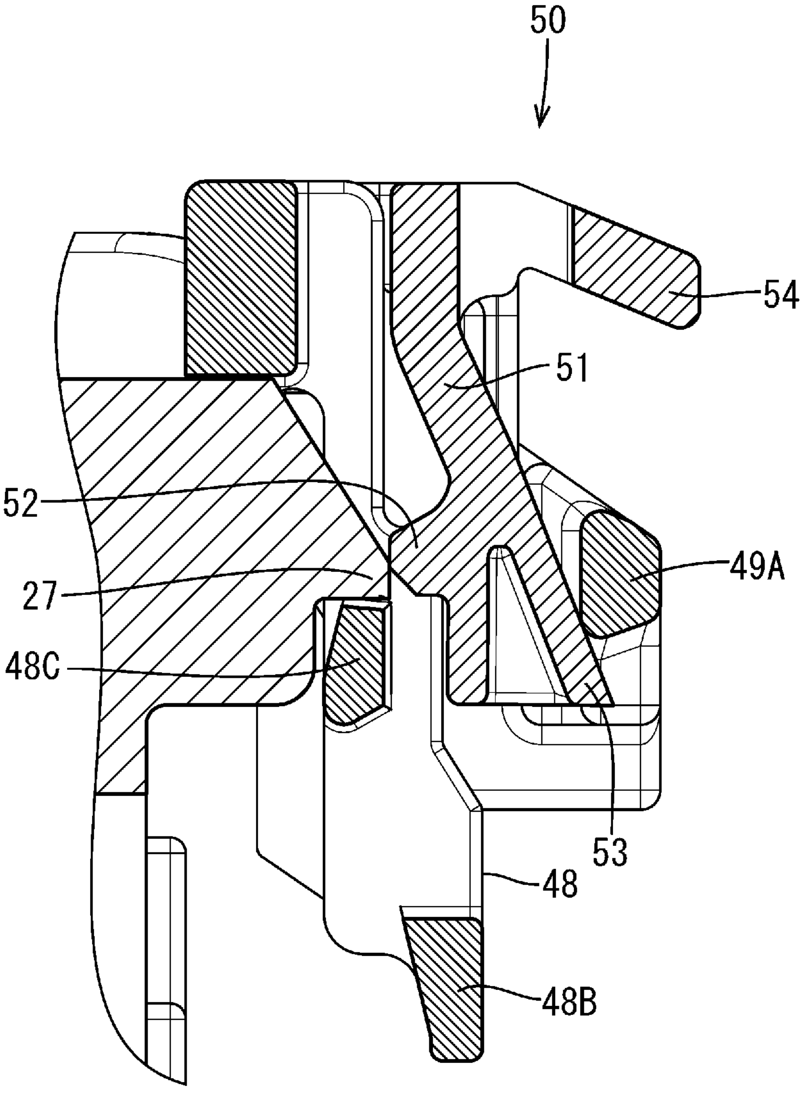
FIG. 18 is a side view in section showing a state where the detecting member rides on a complete locking portion to be resiliently deformed and release locking with the lever lock portion when the lever is at a complete locking position.

If the lever 40 is rotated from the transportation position to the complete locking position, the complete locking piece 48C rides on the complete locking portion 27, thereby being resiliently deformed. Associated with this, the detection arm 51 is also resiliently deformed. If the lever 40 reaches the complete locking position, the complete locking piece 48C rides over the complete locking portion 27, resiliently returns and is locked to the complete locking portion 27 from front as shown in FIG. 18, whereby the lever 40 is held at the complete locking position.

Figure 19:
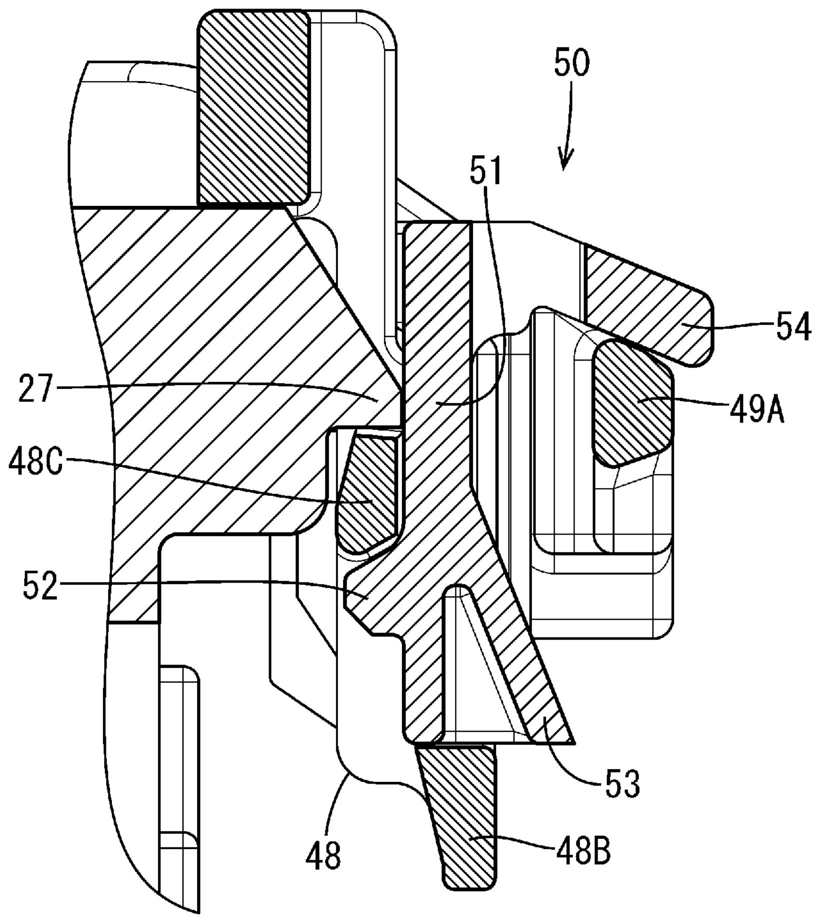
FIG. 19 is a side view in section showing a state where the detecting member is pushed to the detection position, ride over the complete locking portion and the lever lock portion and resiliently returns when the lever is at the complete locking position.

On the other hand, the detection arm 51 of the detecting member 50 is released from locking with the complete locking piece 48C and rides on the complete locking portion 27 due to the detecting protrusion 52 riding on the complete locking portion 27. If the detecting member 50 is pushed forward toward the detection position from this state, the detecting protrusion 52 transfers from the complete locking portion 27 to the complete locking piece 48C. If the detecting member 50 reaches the detection position as shown in FIG. 19, the detection arm 51 resiliently returns, whereby the detecting protrusion 52 is locked to the complete locking piece 48C from front and the front stop portion 54 comes into contact with the contact portion 49A to stop the detecting member 50 in front at the detection position.

(Holding Structure of Lever 40 at Temporary Locking Position)

The lever 40 is returned once to the temporary locking position after the female terminals are inserted into the housing body portion 21 from behind at the transportation position. The lever 40 includes the temporary lock portions 46 for holding the lever 40 at the temporary locking position so that the lever 40 does not rotate in both a direction from the temporary locking position toward the complete locking position (clockwise direction in FIG. 1, hereinafter referred to as a "forward rotation direction") and an opposite direction (counterclockwise direction in FIG. 1, hereinafter referred to as a "reverse rotation direction").

As shown in FIG. 11, the left lock portion 46A of the temporary lock portion 46 is locked to the left temporary locking portion 28A from right and the right lock portion 46B of the temporary lock portion 46 locks the right temporary locking portion 28 from left. The lever 40 is suppressed from rotating in the forward rotation direction from the temporary locking position by the locking of the left lock portions 46A and the left temporary locking portions 28A. Further, the lever 40 is suppressed from rotating in the reverse rotation direction from the temporary locking position by the locking of the right lock portions 46B and the right temporary locking portions 28B.

If the mating connector 1 and the lever-type connector 10 are manually lightly fit, the bases 4 of the mating connector 1 enter the openings 23A of the lever-type connector 10. If the connecting operation is continued, the temporary lock portions 46 ride on the bases 4 while the tapered surfaces 4A of the bases 4 are sliding in contact with the tapered surfaces 46C of the temporary lock portions 46. In this way, the locking of the left lock portions 46A and the left temporary locking portions 28A is released and the locking of the right lock portions 46B and the right temporary locking portions 28B is released.

Although the second ribs 45B of the opening suppressing ribs 45 are in the accommodation grooves 24 at the temporary locking position, clearances 30 are secured between the second ribs 45B and the guide walls 23B. Thus, the opening deformation of the lever 40 is allowed and the cam plates 41 are allowed to be displaced in lock releasing directions. In this way, the lever 40 is allowed to rotate from the temporary locking position to the complete locking position. The respective lock portions 46A, 46B move in the forward rotation direction on the bases 4 and transfer to the left temporary locking portions 28A. If the lever 40 is restored after the respective lock portions 46A, 46B pass through the left temporary locking portions 28A, the respective lock portions 46A, 46B are accommodated into the left escaping recesses 29.

(Holding Structure of Lever 40 at Transportation Position)

The lever 40 includes the transportation lock portions 47 for holding the lever 40 at the transportation position in a state of transportation before connection to the mating connector 1. The transportation position is set near the complete locking position so that the lever 40 does not stand as an obstacle when the female terminals are inserted into the housing body portion 21. As shown in FIG. 6, the transportation lock portion 47 is accommodated inside the cut 25. The transportation lock portion 47 is movable within the width of the cut 25. Specifically, the transportation lock portion 47 is movable between a left locking position shown in FIG. 7 and a right locking position shown in FIG. 8.

Figure 7:
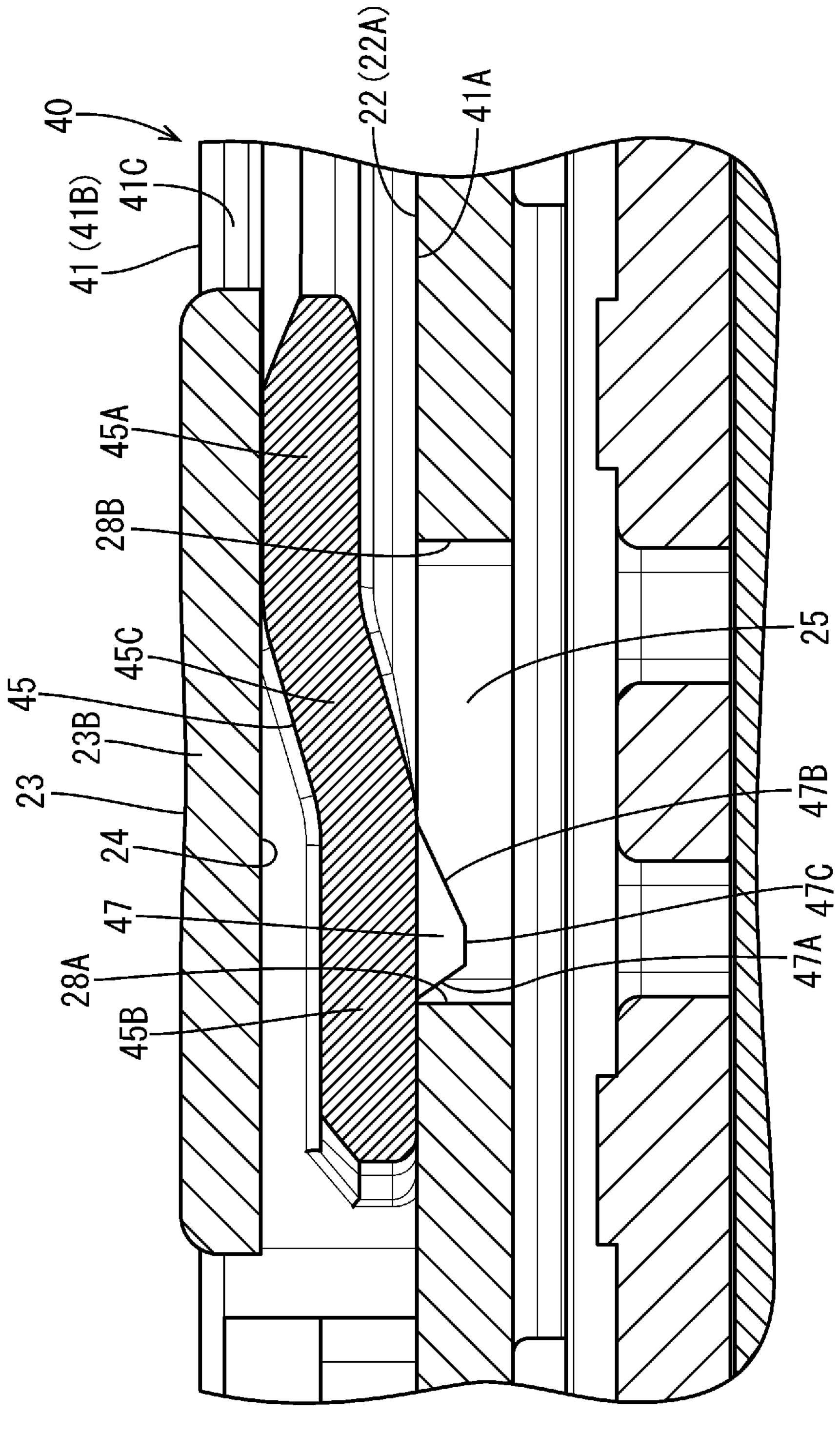
FIG. 7 is a front view in section showing a state where a transportation lock portion is locked to a left temporary locking portion.
Figure 8:
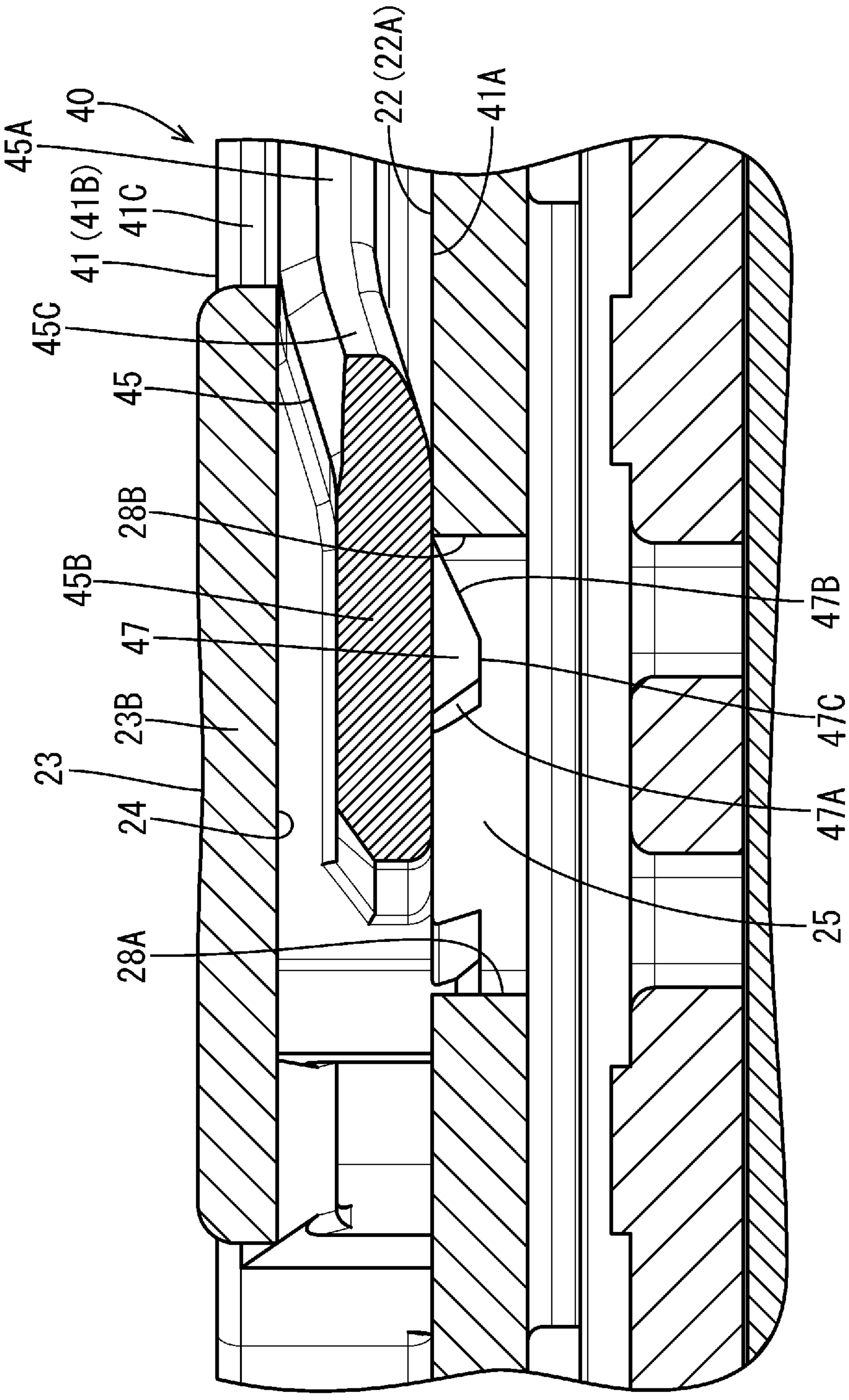
FIG. 8 is a front view in section showing a state where the transportation lock portion is locked to a right temporary locking portion.

At the left locking position shown in FIG. 7, the first temporary locking surface 47A of the transportation lock portion 47 is locked to the left temporary locking portion 28A from right. On the other hand, at the right locking position shown in FIG. 8, the second temporary locking surface 47B of the transportation lock portion 47 is locked to the right temporary locking portion 28B from left. In this way, the lever 40 is held rotatably between the left locking position and the right locking position at the transportation position.

With the transportation lock portions 47 held at the left locking position, the first ribs 45A of the opening suppressing ribs 45 are accommodated in the accommodation grooves 24. Thus, the opening of the lever 40 is suppressed. On the other hand, with the transportation lock portions 47 held at the right locking position, the first ribs 45A come out from the accommodation grooves 24 in the reverse rotation direction. Thus, if the lever 40 continues to be rotated in the reverse rotation direction, the second temporary locking surfaces 47B of the transportation lock portions 47 ride on the right temporary locking portions 28A while sliding in contact with the right temporary locking portions 28A. Associated with this, the lever 40 is opened and deformed.

Figure 9:
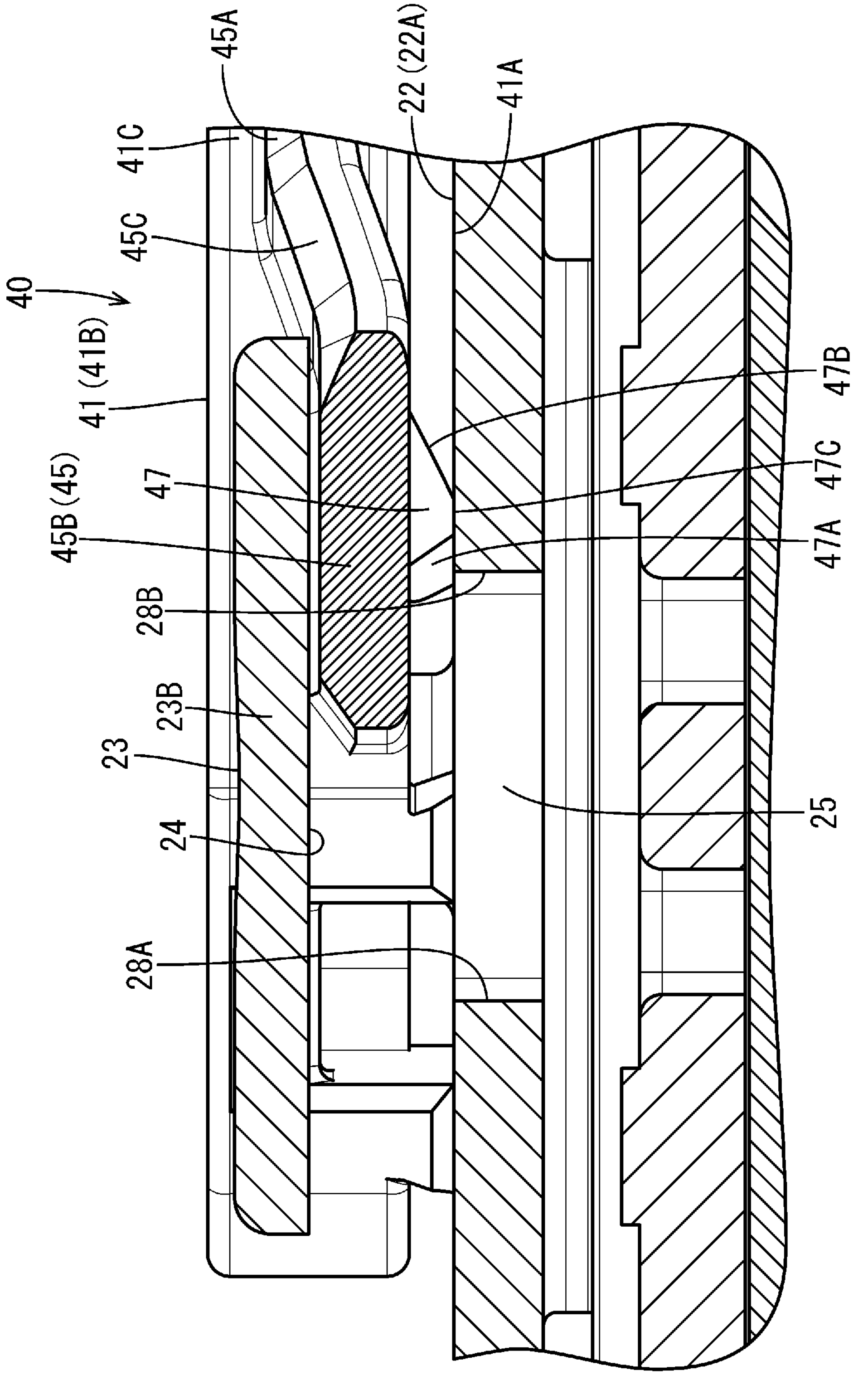
FIG. 9 is a front view in section showing a state where the transportation lock portion is on the right temporary locking portion.

As shown in FIG. 9, with the transportation lock portion 47 riding on the right temporary locking portion 28B, the first rib 45A and the third rib 45C are located outside the accommodation groove 24. On the other hand, since the second rib 45B is located inside the accommodation groove 24 and proximate to the guide wall 23B, the opened and deformed lever 40 is suppressed from being further opened and deformed.

If the lever 40 is further rotated in the reverse rotation direction, the transportation lock portions 47 are fit into the escaping recesses 29 of the receptacle 22 after riding over the right temporary locking portions 28B, whereby the lever 40 is restored. Also after the lever 40 is restored and reaches the temporary locking position, the transportation lock portions 47 are accommodated in the escaping recesses 29.

(Description of Operation of Lever 40 in Each Process)

The lever-type connector 10 is assembled in such a procedure that, after the housing 20 and the lever 40 assembled in the connector process are transported to the harness process, the female terminals connected to ends of wires are inserted into the housing 20 from behind. In a transportation process of transporting a sub-assembly of the housing 20 and the lever 40 to the harness process, the lever 40 is held at the transportation position to avoid interference with another connector, an external matter or the like. At the transportation position, since the detecting member 50 is held at the standby position by the lever lock portion 48 as shown in FIG. 17, the detecting member 50 is not erroneously pushed to the detection position.

Accordingly, an operation of returning the detecting member 50 pushed to the detection position to the standby position in the harness process can be eliminated. Thus, man-hours can be reduced. Further, since the complete locking portion 27 does not contact the lever lock portion 48 until the connection of the lever-type connector 10 and the mating connector 1 is completed, the occurrence of sagging, breakage and the like in the complete locking portion 27 and the lever lock portion 48 can be prevented in the transportation process to the connecting operation.

After the lever-type connector 10 is shipped from the harness process to a delivery destination, the lever-type connector 10 is connected to the mating connector 1. Prior to this connecting operation, the lever 40 is returned from the transportation position to the temporary locking position. As the lever 40 approaches the temporary locking position, the first ribs 45A come out from the accommodation grooves 24, the locking of the transportation lock portions 47 and the right temporary locking portions 28B is released and the transportation lock portions 47 ride over the right temporary locking portions 28B and are accommodated into the escaping recesses 29.

If the lever 40 reaches the temporary locking position, the temporary lock portions 46 are accommodated in the cuts 25 and locked to the respective temporary locking portions 28A, 28B as shown in FIG. 11. Thus, the lever 40 is held at the temporary locking position. At the temporary locking position, since the second ribs 45B of the opening suppressing ribs 45 are in the accommodation grooves 24 of the opening preventing portions 23 as shown in FIG. 1, the lever 40 is allowed to be slightly opened and deformed while being suppressed from being excessively opened and deformed.

The connecting operation of the lever-type connector 10 and the mating connector 1 is performed by rotating the lever 40 from the temporary locking position to the complete locking position after the mating connector 1 is manually lightly fit and temporarily connected to the lever-type connector 10. In a temporarily connected state, the cam pins 3 of the mating connector are located at positions slightly inward of the entrances 43A of the cam grooves 43.

If the lever 40 is rotated in the forward rotation direction from the temporarily connected state, the cam pins 3 are engaged with the inner walls of the cam grooves 43, whereby the mating connector 1 is pulled toward the lever-type connector 10 and the cam pins 3 move toward the back ends 43B of the cam grooves 43. If the lever 40 reaches the complete locking position, the cam pins 3 reach the back ends 43B of the cam grooves 43 and the mating connector 1 reaches a connection completed state in which the mating connector 1 is completely connected to the lever-type connector 10.

In lightly fitting the mating connector 1 to the lever-type connector 10, the bases 4 enter the cuts 25 through the openings 23A of the receptacle 22. At this time, the temporary lock portions 46 ride on the bases 4 while the tapered surfaces 4A of the bases 4 are sliding in contact with the tapered surfaces 46C of the temporary lock portions 46, whereby the lever 40 is opened and deformed. In this way, the locking of the temporary lock portions 46 and the respective temporary locking portions 28A, 28B is released and the lever 40 is allowed to rotate.

If the lever 40 approaches the transportation position, the transportation lock portions 47 approach the right temporary locking portions 28B. At this time, since the lever 40 is opened and deformed by the temporary lock portions 46 and the bases 4, the transportation lock portions 47 smoothly move onto the right temporary locking portions 28B without riding on the right temporary locking portions 28B while sliding in contact with the right temporary locking portions 28B (see FIG. 9). At this point of time, only the second ribs 45B of the opening suppressing ribs 45 are accommodated in the accommodation grooves 24. If the lever 40 is rotated in the forward rotation direction from this state, the third ribs 45C and the first ribs 45A are accommodated into the accommodation grooves 24, whereby the lever 40 gently transfers from an open state to a closed state.

Before connection to the mating connector 1, the transportation lock portions 47 are accommodated into the cuts 25. However, during connection to the mating connector 1, the transportation lock portions 47 transfer from the tops of the right temporary locking portions 28B to the tops of the bases 4 since the bases 4 are accommodated in the cuts 25. Here, since the transportation lock portions 47 are provided to correspond to the second ribs 45B, the second ribs 45B can pass above the bases 4 since the second ribs 45B can be displaced toward the guide walls 23B even if the lever 40 transfers from the open state to the closed state.

In this way, the transportation lock portions 47 advance in the forward rotation direction on the bases 4 accommodated in the cuts 25 while the lever 40 is at the transportation position. If the lever 40 passes through the transportation position, the transportation lock portions 47 transfer from the tops of the bases 4 to the tops of the left temporary locking portions 28A. When the transportation lock portions 47 pass through the left temporary locking portions 28A, the transportation lock portions 47 are accommodated into the left escaping recesses 29 and the second ribs 45B are returned and displaced to original positions.

If the lever 40 approaches the complete locking position, the lock piece 48A are resiliently deformed while the complete locking piece 48C of the lever lock portion 48 is riding on the complete locking portion 27 of the housing 20. If the lever 40 reaches the complete locking position, the complete locking piece 48C rides over the complete locking portion 27 and the lock pieces 48A resiliently returns as shown in FIG. 18. In this way, the complete locking piece 48C and the complete locking portion 27 are locked and the lever 40 is held at the complete locking position.

On the other hand, the detecting protrusion 52 of the detecting member 50 rides on the complete locking portion 27 due to the resilient deformation of the detection arm 51, and the locking of the detecting protrusion 52 and the complete locking piece 48C is released. In this way, the detecting member 50 is allowed to be pushed from the standby position to the detection position. As the detecting member 50 is pushed from the standby position to the detection position, the detecting protrusion 52 transfers from the top of the complete locking portion 27 to the top of the complete locking piece 48C. When the detecting protrusion 52 passes through the complete locking piece 48C, the detection arm 51 resiliently returns. As shown in FIG. 19, the detecting protrusion 52 is locked to the complete locking piece 48C, whereby the detecting member 50 is held at the detection position.

Since the detection arm 51 is located in a deflection space for the complete locking piece 48C at the detection position, the complete locking piece 48C cannot be displaced in a releasing direction and the lever lock portion 48 and the complete locking portion 27 are doubly locked by the detecting member 50.

Further, by displacing the detection releasing portion 53 of the detecting member 50 in the releasing direction, the locking of the detecting protrusion 52 and the complete locking piece 48C can be released and the detecting member 50 can be moved from the detection position to the standby position. Thereafter, by displacing the releasing piece 48B of the lever lock portion 48 in the releasing direction, the locking of the complete locking piece 48C and the complete locking portion 27 can be released and the lever 40 can be rotated from the complete locking position to the temporary locking position. In this way, the lever-type connector 10 and the mating connector 1 can be separated.

Functions and Effects of Embodiment (1) The lever-type connector 10 of the present disclosure is connectable to the mating connector 1 and provided with the housing 20, the lever 40 mounted on the housing 20 movably to the temporary locking position and the complete locking position, and the detecting member 50 mounted on the lever 40 movably to the standby position and the detection position. By a movement of the lever 40 from the temporary locking position to the complete locking position, the lever-type connector 10 and the mating connector 1 reach the connection completed state. The transportation position is set between the temporary locking position and the complete locking position in a movement path of the lever 40. The lever 40 includes the lever lock portion 48 and the transportation lock portions 47. The housing 20 includes the complete locking portions 27 for holding the lever 40 at the complete locking position by being locked to the lever lock portion 48 and the left temporary locking portions 28A and the right temporary locking portions 28B for holding the lever 40 at the transportation position by being locked to the transportation lock portions 47. The detecting member 50 is held at the standby position by being locked to the lever lock portion 48 at the transportation position, and allowed to move from the standby position to the detection position by releasing the locking with the lever lock portion 48 by the complete locking portion 27 at the complete locking position.

For example, in transporting the lever-type connector 10 from the connector process to the harness process, the lever 40 is moved to the transportation position. At the transportation position, the lever 40 is held on the housing 20 by locking the transportation lock portions 47 to the left temporary locking portions 28A and the right temporary locking portions 28B of the housing 20. If the lever 40 is held on the housing 20 at the transportation position, the projection amount of the lever 40 from the housing 20 can be suppressed as compared to the case where the lever 40 is at the temporary locking position. Thus, the interference of the lever 40 with another connector, an external matter or the like is easily avoided. Here, since the detecting member 50 is held at the standby position by the lever lock portion 48 at the transportation position, an inadvertent movement of the detecting member 50 from the standby position to the detection position can be prevented during transportation.

(2) Preferably, the lever 40 is rotatable between the temporary locking position and the complete locking position, the pair of opening suppressing ribs 45 are provided to extend in the rotation direction of the lever 40 on the outer peripheral edges of the cam plates 41, the housing 20 is provided with the pair of guide walls 23B facing the upper and lower surfaces 22A, 22B of the receptacle 22, the pair of accommodation grooves 24 are formed between the pair of guide walls 23B and the upper and lower surfaces 22A, 22B of the receptacle 22, the opening deformation of the lever 40 is suppressed by accommodating the pair of opening suppressing ribs 45 into the pair of accommodation grooves 24 and the transportation lock portions 47 are provided in the regions adjacent to the opening suppressing ribs 45.

By accommodating the opening suppressing ribs 45 into the accommodation grooves 24 in rotating the lever 40, the opening deformation of the lever 40 is suppressed and the detachment of the lever 40 from the housing 20 is suppressed. In this way, the locking of the transportation lock portions 47 and the left and right temporary locking portions 28A, 28B is maintained.

(3) Preferably, the opening suppressing rib 45 includes the first rib 45A proximate to the guide wall 23B and the second rib 45B disposed to be more distant from the guide wall 23B than the first rib 45A, the first rib 45A is accommodated in the accommodation groove 24 at the transportation position, the first rib 45A comes out from the accommodation groove 24 as the lever 40 approaches the temporary locking position, and the transportation lock portion 47 is provided in the region corresponding to the second rib 45B in the rotation direction of the lever 40, out of the region adjacent to the opening suppressing rib 45.

Since the first ribs 45A come into contact with the guide walls 23B at the transportation position, the locking of the transportation lock portions 47 and the left and right temporary locking portions 28A, 28B is maintained and an erroneous movement of the lever 40 to the complete locking position can be suppressed. Since the first ribs 45A come out from the accommodation grooves 24 and the second ribs 45B are displaced in the directions toward the guide walls 23B as the lever 40 approaches the temporary locking position, the opening deformation of the lever 40 is allowed, whereby the locking of the transportation lock portions 47 and the left and right temporary locking portions 28A, 28B can be released.

(4) Preferably, the opening suppressing rib 45 further includes the third rib 45C coupling the first and second ribs 45A, 45B and extending in the direction oblique to the rotation direction of the lever 40.

Since the first and second ribs 45A, 45B are coupled by the third rib 45C, a gradual transition can be made from a state where the first and second ribs 45A, 45C are accommodated in the accommodation groove 24 to a state where only the second rib 45B is accommodated in the accommodation groove 24.

(5) Preferably, the cam plate 41 of the lever 40 has the inner surface 41A facing the upper or lower surface 22A, 22B of the receptacle 22 and the outer surface 41B disposed on the side opposite to the inner surface 41A, the second rib 45B is connected to the inner surface 41A to be flush with the inner surface 41A, the first rib 45A is connected to the outer surface 41B via the step 41C, and the guide wall 23B is disposed along the step 41C with the first rib 45A accommodated in the accommodation groove 24.

Since the second rib 45B is connected to the inner surface 41A to be flush with the inner surface 41A, a thickness (dimension from the inner surface to the outer surface) of the lever 40 can be reduced as compared to the case where the second rib 45B is connected to the inner surface of the lever 40 via a step. Further, since the guide wall 23B is disposed along the step, the projection amount of the guide wall 23B from the outer surface of the housing 20 can be suppressed as compared to the case where the lever 40 is not provided with the step.

OTHER EMBODIMENTS

The above embodiment can be modified and carried out as follows. The above embodiment and the following modifications can be carried out in combination without technically contradicting each other.

Although the transportation position is set near the complete locking position in the above embodiment, the transportation position may be arbitrarily set between the temporary locking position and the complete locking position. For example, the transportation position may be set in the middle between the temporary locking position and the complete locking position.

Although the transportation lock portion 47 is provided in the region adjacent to the second rib 45B of the opening suppressing rib 45 in the above embodiment, a transportation lock portion may be provided in a region deviated from a region adjacent to an opening suppressing rib. For example, the second rib 45B of the opening suppressing rib 45 may be omitted.

Although the third rib 45C of the opening suppressing rib 45 extends in the direction oblique to the rotation direction of the lever 40 in the above embodiment, the third rib 45C may extend in a direction orthogonal to the rotation direction of the lever 40.

Although the second rib of the opening suppressing rib is connected to the inner surface to be flush with the inner surface in the above embodiment, the second rib may be connected to the inner surface of the lever via a step.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A lever-type connector connectable to a mating connector, comprising:

a housing;

a lever mounted on the housing movably to a temporary locking position and a complete locking position; and a detecting member mounted on the lever movably to a standby position and a detection position, the lever-type connector and the mating connector reaching a connection completed state by moving the lever from the temporary locking position to the complete locking position, a transportation position being set between the temporary locking position and the complete locking position in a movement path of the lever, the lever including a lever lock portion and a transportation lock portion, the housing including a complete locking portion for holding the lever at the complete locking position by being locked to the lever lock portion and a temporary locking portion for holding the lever at the transportation position by being locked to the transportation lock portion, and the detecting member being held at the standby position by being locked by the lever lock portion at the transportation position, the detecting member being allowed to move from the standby position to the detection position by releasing locking with the lever lock portion by the complete locking portion at the complete locking position.

2. The lever-type connector of claim 1, wherein:

the lever is rotatable between the temporary locking position and the complete locking position, an opening suppressing rib is provided to extend in a rotation direction of the lever on an outer peripheral edge of the lever, the housing includes a guide wall facing an outer surface of the housing, an accommodation groove is formed between the guide wall and the outer surface of the housing and the lever is suppressed from being opened and deformed by accommodating the opening suppressing rib into the accommodation groove, and the transportation lock portion is provided in a region adjacent to the opening suppressing rib.

3. The lever-type connector of claim 2, wherein:

the opening suppressing rib includes a first rib proximate to the guide wall and a second rib disposed to be more distant from the guide wall than the first rib, and the first rib is accommodated in the accommodation groove at the transportation position, the first rib comes out from the accommodation groove as the lever approaches the transportation position, and the transportation lock portion is provided in a region corresponding to the second rib in the rotation direction of the lever, out of the region adjacent to the opening suppressing rib.

4. The lever-type connector of claim 3, wherein the opening suppressing rib further includes a third rib coupling the first rib and the second rib, the third rib extending in a direction oblique to the rotation direction of the lever.

5. The lever-type connector of claim 3, wherein:

the lever has an inner surface facing the outer surface of the housing and an outer surface disposed on a side opposite to the inner surface, the second rib is connected to the inner surface to be flush with the inner surface and the first rib is connected to the outer surface via a step, and the guide wall is disposed along the step with the first rib accommodated in the accommodation groove.

* * * * *